United States Patent
Taguchi

(10) Patent No.: US 11,448,591 B2
(45) Date of Patent: Sep. 20, 2022

(54) INSPECTION DEVICE, PTP PACKAGING MACHINE AND INSPECTION METHOD

(71) Applicant: CKD CORPORATION, Aichi (JP)

(72) Inventor: Yukihiro Taguchi, Aichi (JP)

(73) Assignee: CKD CORPORATION, Aichi (JP)

( * ) Notice: Subject to any disclaimer, the term of this patent is extended or adjusted under 35 U.S.C. 154(b) by 168 days.

(21) Appl. No.: 17/014,642

(22) Filed: Sep. 8, 2020

(65) Prior Publication Data

US 2020/0400557 A1 Dec. 24, 2020

Related U.S. Application Data

(63) Continuation of application No. PCT/JP2018/037408, filed on Oct. 5, 2018.

(30) Foreign Application Priority Data

Mar. 29, 2018 (JP) .............................. JP2018-063870

(51) Int. Cl.
*G01N 21/3563* (2014.01)
*B65B 11/52* (2006.01)
(Continued)

(52) U.S. Cl.
CPC ............ *G01N 21/3563* (2013.01); *A61J 3/06* (2013.01); *B65B 9/045* (2013.01); *B65B 11/52* (2013.01);
(Continued)

(58) Field of Classification Search
CPC ................................... A61J 3/06; B65B 11/52
See application file for complete search history.

(56) References Cited

U.S. PATENT DOCUMENTS

2003/0028355 A1* 2/2003 Minati ................. G01N 21/359
  702/188
2008/0024778 A1* 1/2008 Honda ................. G01N 21/359
  702/22
(Continued)

FOREIGN PATENT DOCUMENTS

JP 2003017393 A 1/2003
JP 2010112887 A 5/2010
(Continued)

OTHER PUBLICATIONS

International Search Report issued in corresponding International Application No. PCT/JP2018/037408, dated Dec. 25, 2018, with translation (5 pages).
(Continued)

*Primary Examiner* — Joshua G Kotis
(74) *Attorney, Agent, or Firm* — Osha Bergman Watanabe & Burton LLP

(57) ABSTRACT

An inspection device used in manufacture of a Press Through Package (PTP) sheet includes a container film including a pocket portion in which a content is placed and a cover film closing the pocket portion. The inspection device includes: an illumination device that irradiates the content with near-infrared light; a spectroscope that disperses reflected light from the content irradiated with the near-infrared light; an imaging device that takes an image of an optical spectrum of the reflected light dispersed by the spectroscope and acquires spectroscopic image data; and a controller that obtains spectral data of the content based on the spectroscopic image data, executes an inspection of the content based on the spectral data of the content, and executes good or poor quality judgment of the content.

9 Claims, 12 Drawing Sheets

(51) Int. Cl.
| | |
|---|---|
| *B65B 57/00* | (2006.01) |
| *G01N 21/359* | (2014.01) |
| *B65B 47/02* | (2006.01) |
| *G01N 21/94* | (2006.01) |
| *B65B 61/06* | (2006.01) |
| *G01N 21/95* | (2006.01) |
| *A61J 3/06* | (2006.01) |
| *B65B 9/04* | (2006.01) |

(52) U.S. Cl.
CPC .............. *B65B 47/02* (2013.01); *B65B 57/00* (2013.01); *B65B 61/065* (2013.01); *G01N 21/359* (2013.01); *G01N 21/94* (2013.01); *G01N 21/9508* (2013.01)

(56) References Cited

U.S. PATENT DOCUMENTS

| | | | |
|---|---|---|---|
| 2014/0145082 A1* | 5/2014 | Fukuma | G01N 21/9508 250/339.07 |
| 2014/0319351 A1* | 10/2014 | Yamada | G01N 21/8901 250/339.02 |

FOREIGN PATENT DOCUMENTS

| | | |
|---|---|---|
| JP | 2012037488 A | 2/2012 |
| JP | 2017053832 A | 3/2017 |
| WO | 2013002291 A1 | 1/2013 |
| WO | 2017094188 A1 | 6/2017 |

OTHER PUBLICATIONS

Written Opinion issued in corresponding International Application No. PCT/JP2018/037408, dated Dec. 25, 2018 (5 pages).
International Preliminary Report on Patentability issued in corresponding International Application No. PCT/JP2018/037408, dated Sep. 29, 2020, with translation (16 pages).
Tonooka, Masahito, et al., "Surface Profile Measurement by Phase and Contrast Detection using Grating Projection Method," Journal of the Japan Society for Precision Engineering, vol. 66, No. 1, p. 132-136, Jan. 5, 2000 (5 pages).
International Search Report issued in corresponding International Application No. PCT/JP2018/031883, dated Oct. 23, 2018, with translation (5 pages).
Written Opinion issued in corresponding International Application No. PCT/JP2018/031883, dated Oct. 23, 2018, with translation (11 pages).
International Preliminary Report on Patentability issued in corresponding International Application No. PCT/JP2018/031883, dated Jun. 9, 2020 (5 pages).

* cited by examiner

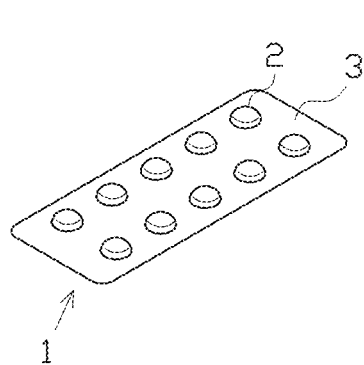 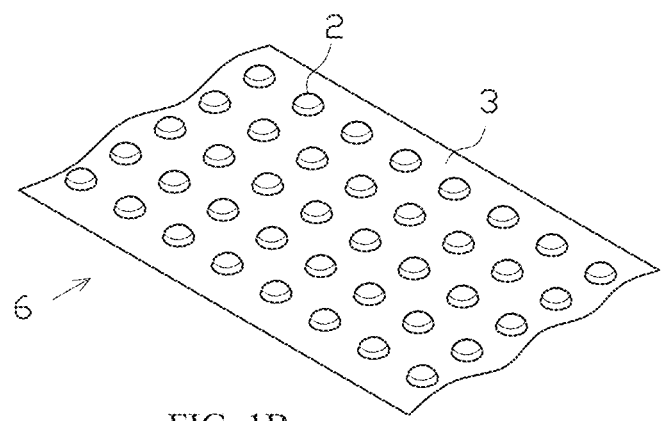
FIG. 1A  FIG. 1B
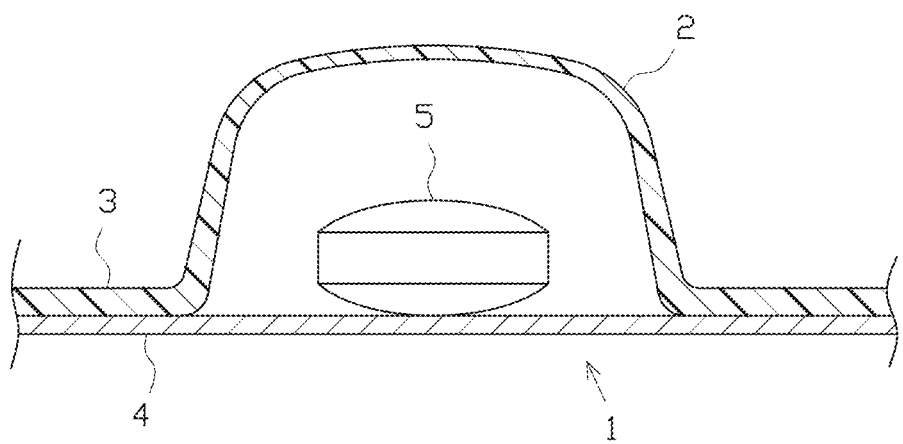
FIG. 2

|  |  | BAND NUMBER 1 (i=1) | BAND NUMBER 2 (i=2) | BAND NUMBER 3 (i=3) |
|---|---|---|---|---|
| NON-DEFECTIVE PRODUCT NUMBER 1 | (j=1) | V(1, 1)=100 | V(2, 1)=300 | V(3, 1)=200 |
| NON-DEFECTIVE PRODUCT NUMBER 2 | (j=2) | V(1, 2)=200 | V(2, 2)=400 | V(3, 2)=300 |
| NON-DEFECTIVE PRODUCT NUMBER 3 | (j=3) | V(1, 3)=100 | V(2, 3)=300 | V(3, 3)=200 |
| NON-DEFECTIVE PRODUCT NUMBER 4 | (j=4) | V(1, 4)=300 | V(2, 4)=500 | V(3, 4)=400 |
| NON-DEFECTIVE PRODUCT NUMBER 5 | (j=5) | V(1, 5)=200 | V(2, 5)=400 | V(3, 5)=300 |
| AVERAGE SPECTRAL INTENSITY | $\mu(i)$ | $\mu(1)=180$ | $\mu(2)=380$ | $\mu(3)=280$ |
| STANDARD DEVIATION | $\sigma(i)$ | $\sigma(1)=74.8$ | $\sigma(2)=74.8$ | $\sigma(3)=74.8$ |

FIG. 15

INSPECTION DEVICE, PTP PACKAGING MACHINE AND INSPECTION METHOD

BACKGROUND

Technical Field

The present invention relates to an inspection device configured to perform inspection for inclusion of any different type of object and the like by taking advantage of spectral analysis, a PTP packaging machine equipped with the inspection device, and an inspection method.

Description of Related Art

A PTP (press through pack) sheet is known as a blister pack sheet generally used in the field of pharmaceutical products and the like.

A PTP sheet is comprised of a container film that has pocket portions filled with contents, such as tablets, and a cover film that is mounted to the container film such as to seal openings of the pocket portions.

In manufacture of the PTP sheet, different type inclusion inspection for inclusion of any different type of the content may be performed by taking advantage of spectral analysis.

A known inspection device that performs such an inspection is configured, for example, to irradiate a tablet filled in a pocket portion of a conveyed container film with near-infrared light, to disperse reflected light from the tablet by a spectroscope, and to identify the type of the tablet, based on spectral data obtained by imaging the dispersed reflected light (as described in, for example, Patent Literature 1).

The inspection device disclosed in Patent Literature 1 is configured to check the intensity in a specific wavelength included in the spectral data of the tablet as the inspection object against data stored in advance in a storage unit and thereby identify the type of the tablet.

In the field of inspection that takes advantage of spectral analysis, there is also a known method of setting in advance an allowable range (reference values that define the allowable range) of spectral data of an object to be inspected, based on an average value and a standard deviation of spectral data with regard to a plurality of objects measured in advance (as described in, for example, Patent Literature 2).

PATENT LITERATURE

Patent Literature 1: WO 2013/002291A
Patent Literature 2: WO 2017/094188A

In the illumination and the imaging element of the inspection device, however, luminance, sensitivity, wavelength characteristics and the like gradual change due to environmental factors such as temperature or temporal factors.

Even the non-defective contents filled in the PTP sheets have slight changes in results of spectral analysis in respective production lots. For example, non-defective tablets have slight changes in results of spectral analysis, due to conditions in tableting (factors such as the particle diameter and the mixing condition of the material and the tableting pressure) and conditions after tableting (for example, the temperature, the humidity, and the time elapsing).

With a view to suppressing an increase in non-defective error ratio (probability that a non-defective product is erroneously determined as a defective product) of the content by taking into account such changes of the inspection device and such changes of the content described above, there is a need to set in advance an allowable range of a relatively large width, for example, to set a coefficient K in Expression (A1), which is given below and is used to specify an allowable range of non-defective products, to a relatively large value. This is, however, likely to increase a defective error ratio (probability that a defective product is erroneously determined as a non-defective product). In the field of manufacturing PTP sheets, especially in the field of pharmaceutical products, the defective error ratio may be substantially equal to "zero".

$$L = \mu \pm K \times \sigma \quad (A1)$$

where "L" denotes an allowable range (an upper limit reference value and a lower limit reference value), "K" denotes a coefficient, "$\mu$" denotes an average value and "$\sigma$" denotes a standard deviation.

Accordingly, like the prior art configuration, the configuration of fixing the allowable range (reference values defining the allowable range) of the spectral data of the content as the inspection object to a set value determined in advance has difficulties in suppressing an increase in defective error ratio as well as an increase in non-defective error ratio with regard to the content and is thus likely to reduce the inspection accuracy.

SUMMARY

One or more embodiments of the present invention provide an inspection device configured to, for example, enhance the inspection accuracy in an inspection that is performed by taking advantage of spectral analysis, as well as a PTP packaging machine and an inspection method.

Functions and advantageous effects that are characteristic of one or more embodiments are also described as appropriate.

In one or more embodiments, an inspection device used in manufacture of a PTP sheet such that a predetermined content is placed in a pocket portion formed in a container film and that a cover film is mounted to the container film so as to close the pocket portion. The inspection device comprises an irradiation unit (i.e., illumination device) configured to irradiate the content with near-infrared light; a spectral unit (i.e., spectroscope) configured to disperse reflected light that is reflected from the content irradiated with the near-infrared light; an imaging unit (i.e., imaging device) configured to take an image of an optical spectrum of the reflected light dispersed by the spectral unit; a spectral data obtaining module (i.e., controller) configured to obtain spectral data of the content, based on spectroscopic image data obtained by the imaging unit; and an inspection module (i.e., controller) configured to perform a predetermined inspection (for example, different type inclusion inspection) with regard to the content, based on the spectral data of the content obtained by the spectral data obtaining module. The inspection module comprises a determination module (i.e., controller) configured to determine whether each of spectral intensities in N specific wavelength bands (where N is a natural number of not less than 1) out of a plurality of wavelength bands included in the spectral data of the content obtained by the spectral data obtaining module is within an allowable range and thereby perform good/poor quality judgment of the content; a spectral data storage module (i.e., controller) configured to successively store spectral data of the content, which is determined as a non-defective product by the determination module, in time series; an average value calculation module (i.e., controller) configured to calculate an average value of the spectral intensities in every N specific wavelength bands, based on spectral data of last M contents (where M is a natural number of not less than 2) stored in time series in the spectral data storage module; a reference value calculation module (i.e., controller) configured to calculate a reference value (an upper limit reference value and/or a lower limit reference value) used for determination of the spectral intensities in every N specific wavelength bands, based on the average value of the spectral intensities in every N specific wavelength bands calculated by the average value calculation module; and a changing module (i.e., controller) configured to change the allowable range in every N specific wavelength bands, based on the reference value in every N specific wavelength bands calculated by the reference value calculation module.

The inspection device of one or more embodiments feeds back the result of spectral analysis with regard to last non-defective contents, while continuously performing the different type inclusion inspection that takes advantage of spectral analysis or the like. The configuration thus enables the allowable range of the spectral data of the content to be changed occasionally.

This configuration enables the good/poor quality judgment of the spectral data of the content as the inspection object to be performed in the inspection process by using the more suitable allowable range, in response to a change of the inspection device with time, a change of the content with time or the like.

As a result, this configuration suppresses an increase in non-defective error ratio with regard to the content and also an increase in defective error ratio and thereby enhances the inspection accuracy, without requiring to set in advance a relatively large width of the allowable range.

The spectral intensity in each of the wavelength bands included in the near-infrared light emitted from the irradiation unit is not uniform, so that the sensitivity (receiving amount of light) of the imaging unit configured to take an image of the optical spectrum, a change in the sensitivity with time, and the like differ in the respective wavelength bands.

The inspection device of one or more embodiments is, however, configured to set the allowable range of the spectral intensities in every N specific wavelength bands and to change the allowable range in every specific wavelength bands. This configuration allows for the more detailed response to a change of the inspection device with time, a change of the content with time or the like, with regard to every specific wavelength bands, thus further enhancing the inspection accuracy.

The inspection device of one or more embodiments may further comprise, for example, "a standard deviation calculation module configured to calculate a standard deviation of the spectral intensities in every N specific wavelength bands, based on the spectral data of the last M contents (where M is the natural number of not less than 2) stored in time series in the spectral data storage module". The "reference value calculation module" described above may be configured to "calculate the reference value (the upper limit reference value and/or the lower limit reference value) used for determination of the spectral intensities in every N specific wavelength bands, based on the average value of the spectral intensities in every N specific wavelength bands calculated by the average value calculation module and the standard deviation of the spectral intensities in every N specific wavelength bands calculated by the standard deviation calculation module".

In the inspection device of one or more embodiments, the inspection module may further comprise a weighting module used when the spectral data of the last M contents stored in time series in the spectral data storage module are used in a predetermined process (for example, an average value calculation process by the average value calculation module) and configured to perform a predetermined weighting process, such that a reflection ratio of later spectral data in time series or a group of spectral data that are continuous in time series and that are later in time series is higher than a reflection ratio of predetermined spectral data or a group of predetermined spectral data that are continuous in time series, among the spectral data of the M contents.

The inspection device of one or more embodiments allows for the weighting process, for example, doubling (corresponding to two contents) the weight applied to newer second spectral data in time series compared with the weight applied to older first spectral data in time series.

This configuration can set the allowable range more suitable for the situation in the inspection and thus further enhances the inspection accuracy.

In the inspection device of one or more embodiments, the imaging unit may be configured to simultaneously take images of optical spectra of reflected lights from the contents placed at a plurality of positions (for example, a plurality of positions in a direction perpendicular to a conveying direction of the content). The inspection module (the determination module, the spectral data storage module, the average value calculation module, the reference value calculation module and the changing module) may be provided corresponding to each of the plurality of positions.

Due to, for example, an unevenness in luminance of the near-infrared light emitted from the irradiation unit to an imaging area and a variation in sensitivity based on characteristics of a plurality of light-receiving elements constituting an imaging element (for example, a CCD area sensor) of the imaging unit, the sensitivity (receiving amount of light) of the imaging element, a change in the sensitivity with time, and the like also differ at respective coordinate positions, The inspection device of one or more embodiments is, however, configured to individually perform the inspection with regard to the contents at the plurality of positions.

More specifically, the inspection device of one or more embodiments is configured to perform the good/poor quality judgment of the content at each of the plurality of positions, based on the allowable range of the spectral data set corresponding to each of the plurality of positions and comprises spectral data storage modules provided individually corresponding to the plurality of positions to sequentially store spectral data of non-defective contents in time series. The inspection device of one or more embodiments is further configured to perform the processes, such as the calculation of the average value of the spectral intensities, the calculation of the reference value, and the change of the allowable range described above individually at each of the positions, based on the spectral data stored in the spectral data storage modules.

As a result, this configuration allows for the more detailed response to a change of the inspection device with time, a change of the content with time or the like with regard to each position, thus further enhancing the inspection accuracy.

One or more embodiments provide a PTP packaging machine configured to manufacture a PTP sheet such that a predetermined content is placed in a pocket portion formed in a container film and that a cover film is mounted to the container film so as to close the pocket portion. The PTP packaging machine comprises a pocket portion forming unit (i.e., pocket portion former) configured to form the pocket portion in the container film in a belt-like shape; a filling unit (i.e., filler) configured to fill the content into the pocket portion; a mounting unit (i.e., mounter) configured to mount the cover film in a belt-like shape to the container film with the pocket portion filled with the content, so as to close the pocket portion; a separation unit (i.e., separator) (including a punching unit configured to punch out the belt-like body in the unit of a sheet) configured to separate the PTP sheet from a belt-like body (PTP film in a belt-like shape) obtained by mounting the cover film to the container film; and the inspection device described above.

Like the configuration of one or more embodiments, the PTP packing machine provided with the above inspection device or the like has an advantage of, for example, excluding a defective product including a different type of object with high accuracy in the process of manufacturing the PTP sheet. The PTP packaging machine may be configured to include a discharge unit that discharges the PTP sheet determined as defective by the inspection device.

The PTP packaging machine of one or more embodiments may employ a configuration that the inspection device is arranged in a "previous process before the pocket portion is filled with the content by the filling unit". This configuration enables the different type of content to be excluded in a pre-stage before the content is filled into the pocket portion and accordingly reduces defective PTP sheets.

The PTP packaging machine of one or more embodiments may employ a configuration that the inspection device is arranged in "a post process after the pocket portion is filled with the content by the filling unit and a previous process before the cover film is mounted by the mounting unit". This configuration enables inspection of the content to be performed without any shielding substance and thereby further enhances the inspection accuracy.

The PTP packaging machine of one or more embodiments may employ a configuration that the inspection device is arranged in "a post process after the cover film is mounted by the mounting unit and a previous process before the PTP sheet is separated by the separation unit". This configuration enables inspection to be performed in a state that contents are not exchanged, and thereby further enhances the inspection accuracy.

The PTP packaging machine of one or more embodiments may employ a configuration that the inspection device is arranged in "a post process after the PTP sheet is separated by the separation unit". This configuration enables a check for inclusion of any defective product to be performed in a final stage.

One or more embodiments provide an inspection method of performing a predetermined inspection (for example, different type inclusion inspection) that takes advantage of spectral analysis in manufacture of a PTP sheet such that a predetermined content is placed in a pocket portion formed in a container film and that a cover film is mounted to the container film so as to close the pocket portion. The inspection method comprises an irradiation process of irradiating the content with near-infrared light; a dispersion process of dispersing reflected light that is reflected from the content irradiated with the near-infrared light; an imaging process of taking an image of an optical spectrum of the reflected light dispersed in the dispersion process; a spectral data obtaining process of obtaining spectral data of the content, based on spectroscopic image data obtained in the imaging process; and a determination process of determining whether each of spectral intensities in N specific wavelength bands (where N is a natural number of not less than 1) out of a plurality of wavelength bands included in the spectral data of the content obtained in the spectral data obtaining process is within an allowable range and thereby performing good/poor quality judgment of the content; a spectral data storage process of successively storing spectral data of the content, which is determined as a non-defective product in the determination process, in time series; an average value calculation process of calculating an average value of the spectral intensities in every N specific wavelength bands, based on spectral data of last M contents (where M is a natural number of not less than 2) stored in time series in the spectral data storage process; a reference value calculation process of calculating a reference value (an upper limit reference value and/or a lower limit reference value) used for determination of the spectral intensities in every N specific wavelength bands, based on the average value of the spectral intensities in every N specific wavelength bands calculated in the average value calculation process; and a changing process of changing the allowable range in every N specific wavelength bands, based on the reference value in every N specific wavelength bands calculated in the reference value calculation process.

The configuration of one or more embodiments has similar functions and advantageous effects described above.

The inspection method of one or more embodiments may be configured to further comprise, for example, "a standard deviation calculation process of calculating a standard deviation of the spectral intensities in every N specific wavelength bands, based on the spectral data of the last M contents (where M is the natural number of not less than 2) stored in time series in the spectral data storage process". The "reference value calculation process" described above may be configured to "calculate the reference value (the upper limit reference value and/or the lower limit reference value) used for determination of the spectral intensities in every N specific wavelength bands, based on the average value of the spectral intensities in every N specific wavelength bands calculated in the average value calculation process and the standard deviation of the spectral intensities in every N specific wavelength bands calculated in the standard deviation calculation process".

BRIEF DESCRIPTION OF DRAWINGS

FIG. 1A is a perspective view illustrating a PTP sheet and FIG. 1B is a perspective view illustrating a PTP film.

FIG. 2 is a partly enlarged sectional view illustrating a pocket portion of the PTP sheet.

FIG. 9 is a diagram illustrating a relationship between a conveying direction imaging range and a tablet and the like.

FIG. 15 is a table illustrating spectral intensities, average spectral intensities and standard deviations in part of wavelength bands with regard to part of non-defective product data.

DETAILED DESCRIPTION OF EMBODIMENTS

Figure 3:
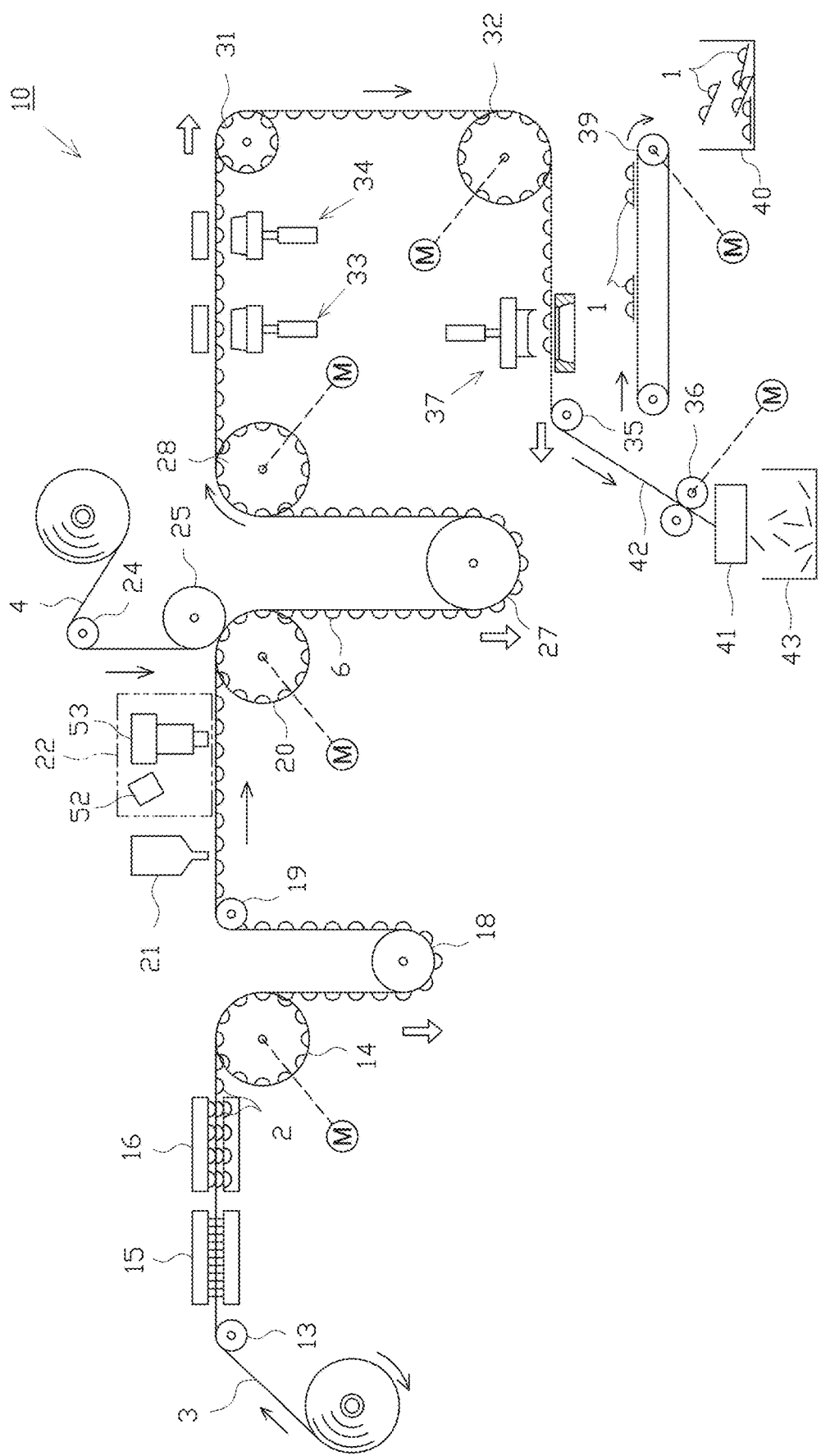
FIG. 3 is a diagram illustrating the schematic configuration of a PTP packaging machine.

The following describes embodiments with reference to drawings. The configuration of a PTP sheet is described first in detail.

As shown in FIG. 1 and FIG. 2, a PTP sheet 1 includes a container film 3 provided with a plurality of pocket portions 2, and a cover film 4 mounted to the container film 3 such as to close the respective pocket portions 2.

The container film 3 according to one or more embodiments is made from a transparent or translucent thermoplastic resin material, such as PP (polypropylene) or PVC (polyvinyl chloride), and has translucency. The cover film 4 is, on the other hand, made from an opaque material (for example, aluminum foil) with a sealant made of, for example, a polypropylene resin, provided on the surface thereof.

The PTP sheet 1 is formed in an approximately rectangular shape in plan view. The PTP sheet 1 is configured such that two pocket arrays are formed along a sheet short side direction and that each pocket array includes five pocket portions 2 arranged along a sheet longitudinal direction. Accordingly, the PTP sheet 1 has a total of ten pocket portions 2. One tablet 5 is placed as a content in each of the pocket portions 2.

The PTP sheet 1 (shown in FIG. 1A) is manufactured by punching sheets from a belt-like PTP film 6 (shown in FIG. 1B) that is comprised of the belt-like container film 3 and the belt-like cover film 4.

The following describes the general configuration of a PTP packaging machine 10 used to manufacture the PTP sheet 1 described above, with reference to FIG. 3.

As shown in FIG. 3, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is linked with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. In the state that the container film 3 is heated to be relatively soft by the heating device 15, the plurality of pocket portions 2 are formed at predetermined positions of the container film 3 by the pocket portion forming device 16 (pocket portion forming process). The heating device 15 and the pocket portion forming device 16 are configured as the pocket portion forming unit according to one or more embodiments. Formation of the pocket portions 2 is performed during an interval between conveying operations of the container film 3 by the intermittent feed roll 14.

The container film 3 fed from the intermittent feed roll 14 is sequentially laid on a tension roll 18, a guide roll 19 and a film receiving roll 20 in this order. The film receiving roll 20 is linked with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 is placed along the conveyance path of the container film 3 between the guide roll 19 and the film receiving roll 20. The tablet filling device 21 serves as the filling unit (i.e., filler) to automatically fill the tablets 5 into the pocket portions 2. The tablet filling device 21 opens a shutter at every predetermined time interval to drop the tablet 5, in synchronism with the conveying operation of the container film 3 by the film receiving roll 20. Each of the pocket portions 2 is filled with the tablet 5 by this shutter opening operation (filling process).

An inspection device 22 is placed along the conveyance path of the container film 3 between the tablet filling device 21 and the film receiving roll 20. The inspection device 22 is a spectroscopic analyzer configured to perform an inspection by taking advantage of spectral analysis and more specifically to check for inclusion of any different type of object. The details of the inspection device 22 will be described later.

A film roll of the belt-like cover film 4 is also wound in a roll form on a most upstream side.

A pullout end of the cover film 4 wound in the roll form is guided by a guide roll 24 to a heating roll 25. The heating roll 25 is pressed against to be in contact with the film receiving roll 20 described above. The container film 3 and the cover film 4 are accordingly fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations provides the belt-like PTP film 6 manufactured such that the tablet 5 is filled in each of the pocket portions 2. The heating roll 25 has minute protrusions formed on the surface of the heating roll 25 in a net-like pattern for sealing. Strongly pressing these protrusions against the films provides secure sealing. The film receiving roll 20 and the heating roll 25 are configured as the mounting unit (i.e., mounter) according to one or more embodiments.

The PTP film 6 fed from the film receiving roll 20 is sequentially laid on a tension roll 27 and an intermittent feed roll 28 in this order. The intermittent feed roll 28 is linked with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is linked with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is placed along the conveyance path of the PTP film 6 between the intermittent feed roll 32 and the tension roll 35. The sheet punching device 37 serves as a sheet punching unit (i.e., separation unit or separator) to punch out the outer periphery of each portion of the PTP film 6 in the unit of PTP sheet 1.

The respective PTP sheets 1 punched out by the sheet punching device 37 are conveyed by a conveyor 39 and are temporarily accumulated in a finished product hopper 40 (separation process). When a PTP sheet 1 is determined as a defective product by the inspection device 22 described above, however, this PTP sheet 1 determined as defective is not conveyed to the finished product hopper 40 but is separately discharged by a non-illustrated defective sheet discharge mechanism serving as the discharge unit.

A cutting device 41 is provided on a downstream side of the continuous feed roll 36. An unrequired film portion 42 that is a residual part (scrap part) remaining in a belt-like form after punching out by the sheet punching device 37 is guided by the tension roll 35 and the continuous feed roll 36 and is subsequently led to the cutting device 41. A driven roll is pressed against to be in contact with the continuous feed roll 36, so that the unrequired film portion 42 is placed and conveyed between the driven roll and the continuous feed roll 36. The cutting device 41 serves to cut the unrequired film portion 42 into predetermined dimensions as scraps. These scraps are accumulated in a scrap hopper 43 and are disposed separately.

Each of the rolls, for example, the rolls 14, 20, 28, 31 and 32 described above is arranged such that the roll surface is opposed to the pocket portions 2. The surface of each roll, for example, the surface of the intermittent feed roll 14, has recesses that are formed to place the pocket portions 2 therein. This configuration suppresses the pocket portions 2 from being crushed. The feeding operation with the pocket portions 2 placed in the recesses of each roll, for example, the intermittent feed roll 14, achieves the reliable intermittent feed and continuous feed.

Figure 4:
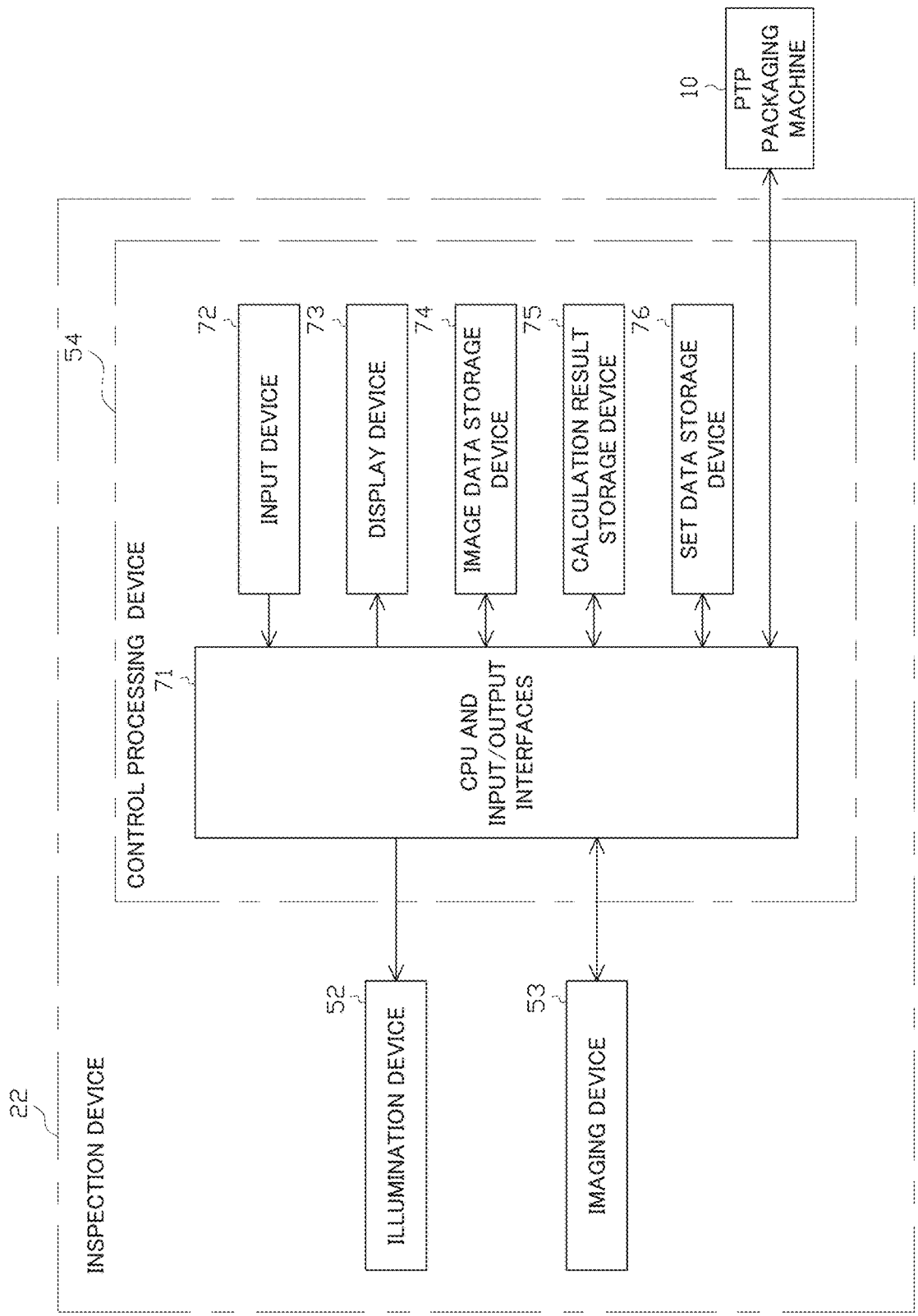
FIG. 4 is a block diagram illustrating the electrical configuration of an inspection device.
Figure 5:
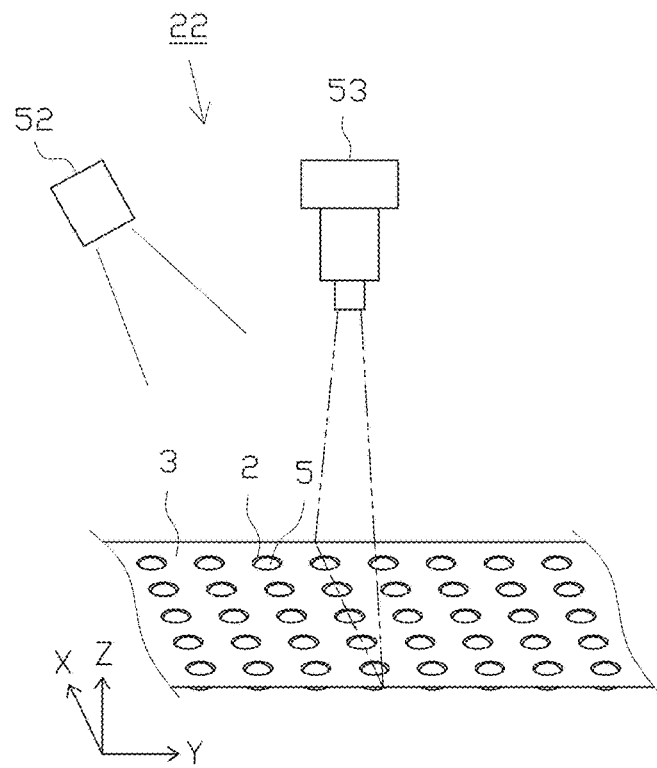
FIG. 5 is a perspective view schematically illustrating the arrangement configuration of the inspection device.

The foregoing describes the outline of the PTP packaging machine 10. The following describes the configuration of the above inspection device 22 in detail with reference to drawings. FIG. 4 is a block diagram illustrating the electrical configuration of the inspection device 22. FIG. 5 is a perspective view schematically illustrating the arrangement configuration of the inspection device 22.

As shown in FIG. 4 and FIG. 5, the inspection device 22 includes an illumination device 52, an imaging device 53, and a control processing device 54 (i.e., controller) configured to perform various controls in the inspection device 22, for example, drive controls of the illumination device 52 and the imaging device 53, image processing, arithmetic operations and the like.

The illumination device 52 and the imaging device 53 are placed on an opening side of the pocket portions 2 of the container film 3. More specifically, according to one or more embodiments, an inspection for inclusion of any different type of object is performed from the opening side of the pocket portions 2 of the container film 3 in a stage prior to mounting of the cover film 4.

The illumination device 52 has a known configuration to radiate near-infrared light and is configured as the irradiation unit according to one or more embodiments. The illumination device 52 is arranged to irradiate a predetermined area on the continuously fed container film 3 obliquely downward with near-infrared light.

According to one or more embodiments, a halogen lamp is employed for the illumination device 52 as a light source configured to emit near-infrared light having a continuous spectrum (for example, a near infrared range having a wavelength of 700 to 2500 nm). Other examples usable as the light source include a deuterium lamp, a tungsten lamp, and a xenon lamp.

Figure 6:
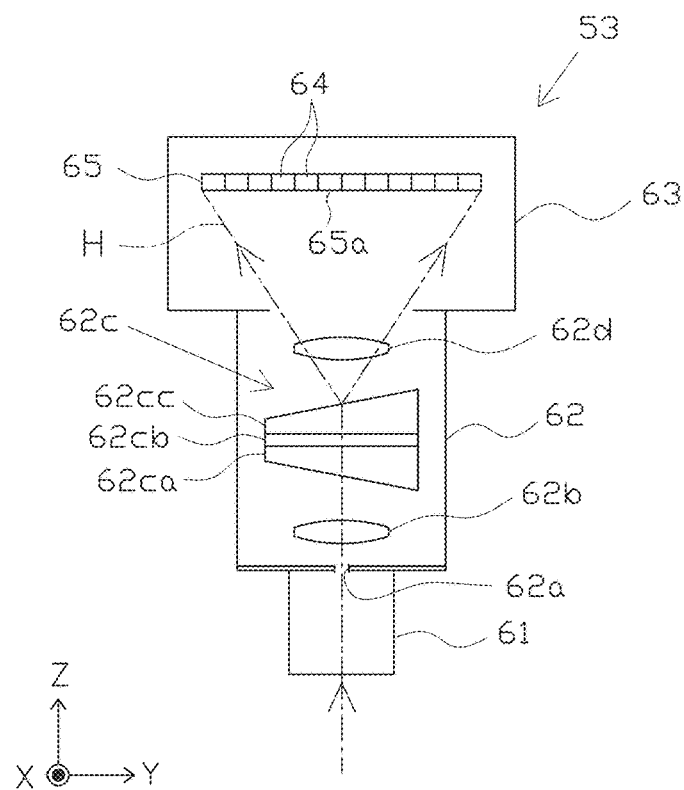
FIG. 6 is a diagram illustrating the schematic configuration of an imaging device.

As shown in FIG. 6, the imaging device 53 includes an optical lens assembly 61, a two-dimensional spectroscope 62 serving as the spectral unit, and a camera 63 serving as an imaging unit (i.e., imaging device).

The optical lens assembly 61 is comprised of a plurality of non-illustrated lenses and the like and is configured to convert incident light into parallel light. The optical lens assembly 61 has an optical axis that is set along a vertical direction (Z direction).

The optical lens assembly 61 is set to focus the incident light at the position of a slit 62a of the two-dimensional spectroscope 62 described later. As a matter of convenience, the following describes an example of employing a double-sided telecentric lens for the optical lens assembly 61. An image-sided telecentric lens may, however, also be employable for the optical lens assembly 61.

The two-dimensional spectroscope 62 is configured to include a slit 62a, an incident-side lens 62b, a spectral portion 62c and an emission-side lens 62d. The spectral portion 62c is configured to include an incident-side prism 62ca, a transmission type diffraction grating 62cb, and an emission-side prism 62cc.

Under the configuration described above, the light passing through the slit 62a is converted into parallel light by the incident-side lens 62b, is dispersed by the spectral portion 62c, and is focused by the emission-side lens 62d on an imaging element 65 of the camera 63 described later as a two-dimensional spectroscopic image (optical spectral image).

The slit 62a is formed to have a long approximately rectangular (linear) opening and is provided such that an opening width direction (short side direction) thereof is arranged along a film conveying direction of the container film 3 (Y direction) and that a longitudinal direction thereof is arranged along a film width direction of the container film 3 (X direction) orthogonal to the conveying direction. This configuration causes the two-dimensional spectroscope 62 to disperse the incident light in the opening width direction of the slit 62a, i.e., in the film conveying direction (Y direction). Accordingly, the film conveying direction (Y direction) denotes the wavelength dispersion direction according to one or more embodiments.

The camera 63 includes an imaging element 65 having a light receiving surface 65a where a plurality of light-receiving elements (light receivers) 64 are two-dimensionally arranged in a matrix arrangement. According to one or more embodiments, a known CCD area sensor having sufficient sensitivity to, for example, a wavelength range of 1300 to 2000 nm, out of the near infrared range, is employed as the imaging element 65.

A generally known configuration of the CCD area sensor includes a plurality of light-receiving elements that are two-dimensionally arranged in a matrix arrangement and that are formed from photoelectric transducers (for example, photo diodes) configured to convert the incident light into electric charges corresponding to its quantity of light and to accumulate the converted electric charges therein; a plurality of vertical transfer portions that are configured to successively transfer the electric charges accumulated in the respective light-receiving elements in a vertical direction; a horizontal transfer portion that are configured to successively transfer the electric charges transferred from the vertical transfer portions in a horizontal direction; and an output amplifier that is configured to convert the electric charges transferred from the horizontal transfer portion into a voltage, to amplify the voltage and to output the amplified voltage.

The imaging element is, however, not necessarily limited to this example, but another sensor having sensitivity to the near infrared range is also employable as the imaging element. For example, a CMOS sensor or an MCT (HgCdTe) sensor may be employed as the imaging element.

The imaging device 53 has a field of vision (imaging area) that is a linear region extended along the film width direction (X direction) and that is a region including at least the entire film width direction of the container film 3 (as shown by a two-dot chain line portion in FIG. 5). The field of vision of the imaging device 53 in the film conveying direction (Y direction) is, on the other hand, a region corresponding to the opening width of the slit 62a. In other words, the field of vision is a region that causes an image of the light passing through the slit 62a (slit light) to be formed on the light receiving surface 65a of the imaging element 65.

This configuration causes each wavelength band (for example, every bandwidth of 10 to 20 nm) of the optical spectrum of the reflected light that is reflected at each position in the film width direction (X direction) of the container film 3 to be received by each of the light-receiving elements 64 of the imaging element 65. A signal corresponding to the intensity of the light received by each of the light-receiving elements 64 is converted into a digital signal and is then output from the camera 63 to the control processing device 54. Accordingly, an image signal (spectroscopic image data) corresponding to one image plane that is imaged by the entire light receiving surface 65a of the imaging element 65 is output to the control processing device 54.

The control processing device 54 includes a CPU and input/output interfaces 71 (hereinafter referred to as "CPU and the like 71") that is configured to control the entire inspection device 22, an input device 72 that is configured as the "input unit" by, for example, a keyboard and a mouse or by a touch panel, a display device 73 that is configured as the "display unit" including a display screen such as a CRT screen or a liquid crystal screen, an image data storage device 74 that is configured to store various image data and the like, a calculation result storage device 75 that is configured to store results of various arithmetic operations and the like, and a set data storage device 76 that is configured to store various pieces of information in advance. These devices 72 to 76 are electrically connected with the CPU and the like 71.

The CPU and the like 71 is connected with the PTP packaging machine 10 such as to send and receive various signals to and from the PTP packaging machine 10. This configuration enables the CPU and the like 71 to control, for example, the defective sheet discharge mechanism of the PTP packaging machine 10.

The image data storage device 74 is configured to store, for example, spectroscopic image data obtained by the imaging device 53, spectral image data obtained on the basis of the spectroscopic image data, and binarized image data after a binarization process.

The calculation result storage device 75 is configured to store, for example, inspection result data and statistical data obtained by statistically processing the inspection result data. These inspection result data and statistical data may be displayed appropriately on the display device 73.

The set data storage device 76 is configured to store, for example, the shapes and the dimensions of the PTP sheet 1, the pocket portion 2 and the tablet 5, and a spectrum allowable range table used for good/poor quality judgment of the tablets 5.

The following describes a procedure of different type inclusion inspection (inspection process) performed by the inspection device 22.

Figure 7:
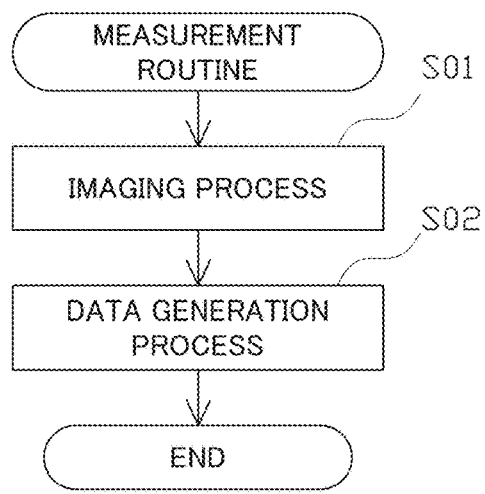
FIG. 7 is a flowchart showing a measurement routine.

A measurement routine performed to obtain spectral data is described first with reference to the flowchart of FIG. 7. This routine is a process performed repeatedly every time a predetermined amount of the container film 3 is conveyed.

At step S01, the control processing device 54 first causes the imaging device 53 to perform an imaging process (exposure process), while irradiating the continuously conveyed container film 3 (tablet 5) with near-infrared light emitted from the illumination device 52 (irradiation process).

The control processing device 54 drives and controls the imaging device 53 in response to a signal input from a non-illustrated encoder provided in the PTP packaging machine 10, and stores spectroscopic image data taken by the imaging device 53 into the image data storage device 74.

Accordingly, reflected light that is reflected in a conveying direction imaging range W (shown in FIG. 9), out of the near-infrared light emitted from the illumination device 52 toward the container film 3, during an execution period of the imaging process of step S01 (exposure period) enters the imaging device 53. In other words, an image of the conveying direction imaging range W is taken by one imaging process.

The reflected light entering the imaging device 53 is dispersed by the two-dimensional spectroscope 62 (dispersion process) and is taken in the form of a spectroscopic image (optical spectrum) by the imaging element 65 of the camera 63 (imaging process). During the execution period of the imaging process (exposure period), the container film 3 (the tablet 5) is continuously conveyed, so that this process takes an image of an averaged optical spectrum in the conveying direction imaging range W (as shown in FIG. 8).

Figure 8:
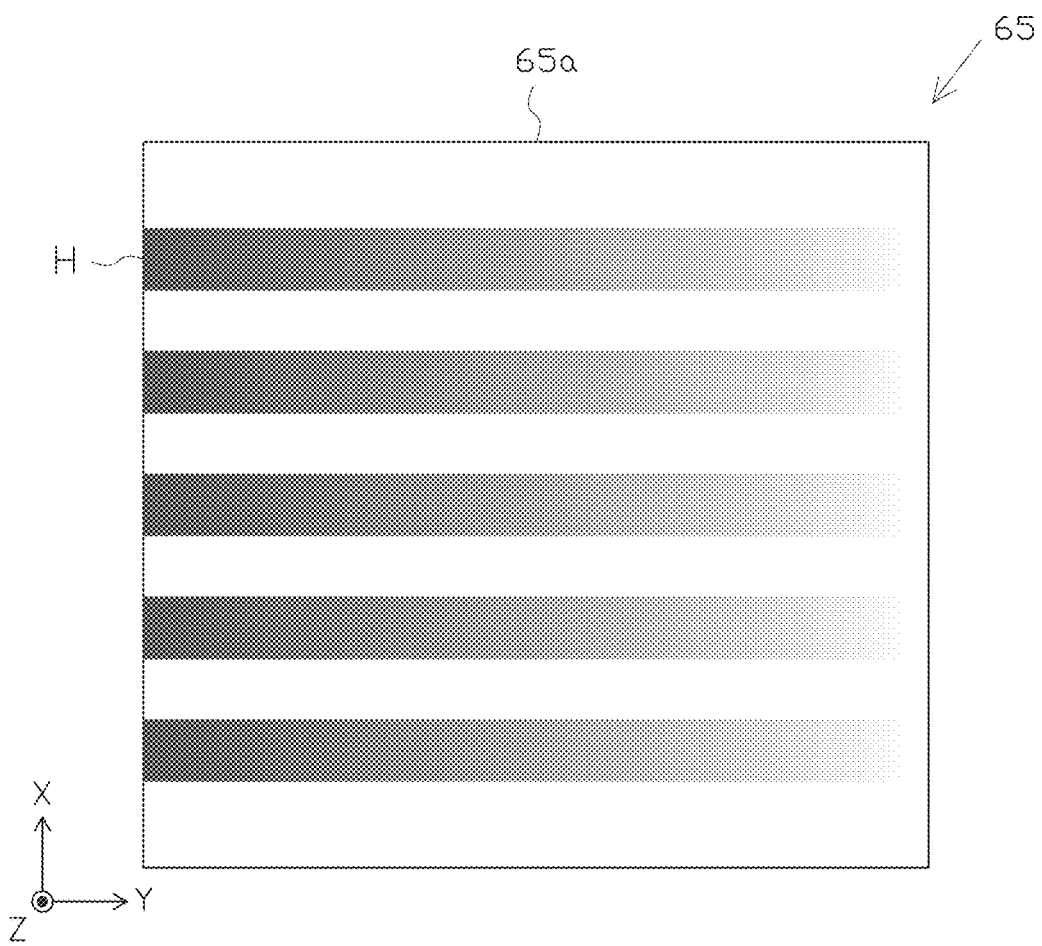
FIG. 8 is a diagram illustrating an optical spectrum projected onto an imaging element.

FIG. 8 is a diagram illustrating the state that an optical spectrum H of reflected light that is reflected at a predetermined position on the tablet 5 is projected onto the light receiving surface 65a of the imaging element 65. As a matter of convenience, FIG. 8 illustrates only the optical spectrum H with regard to the tablet 5, while omitting optical spectra with regard to the other locations (for example, the container film 3).

The spectroscopic image (optical spectrum) data taken by the imaging device 53 is output to the control processing device 54 during an interval period and is stored into the image data storage device 74. The interval period herein denotes a reading period of image data. Accordingly, an imaging cycle of the imaging device 53 is expressed by a total time of the exposure period that is the execution period of the imaging process and the interval period.

After obtaining the spectroscopic image data, the control processing device 54 starts a data generation process at step S02.

The data generation process generates spectral data, based on the spectroscopic image data obtained at step S01. After generating the spectral data, the control processing device 54 stores the generated spectral data into the image data storage device 74 and then terminates this routine. This process corresponds to the spectral data obtaining process according to one or more embodiments. The processing function of the control processing device 54 that performs this process configures the spectral data obtaining module according to one or more embodiments.

Figure 9:
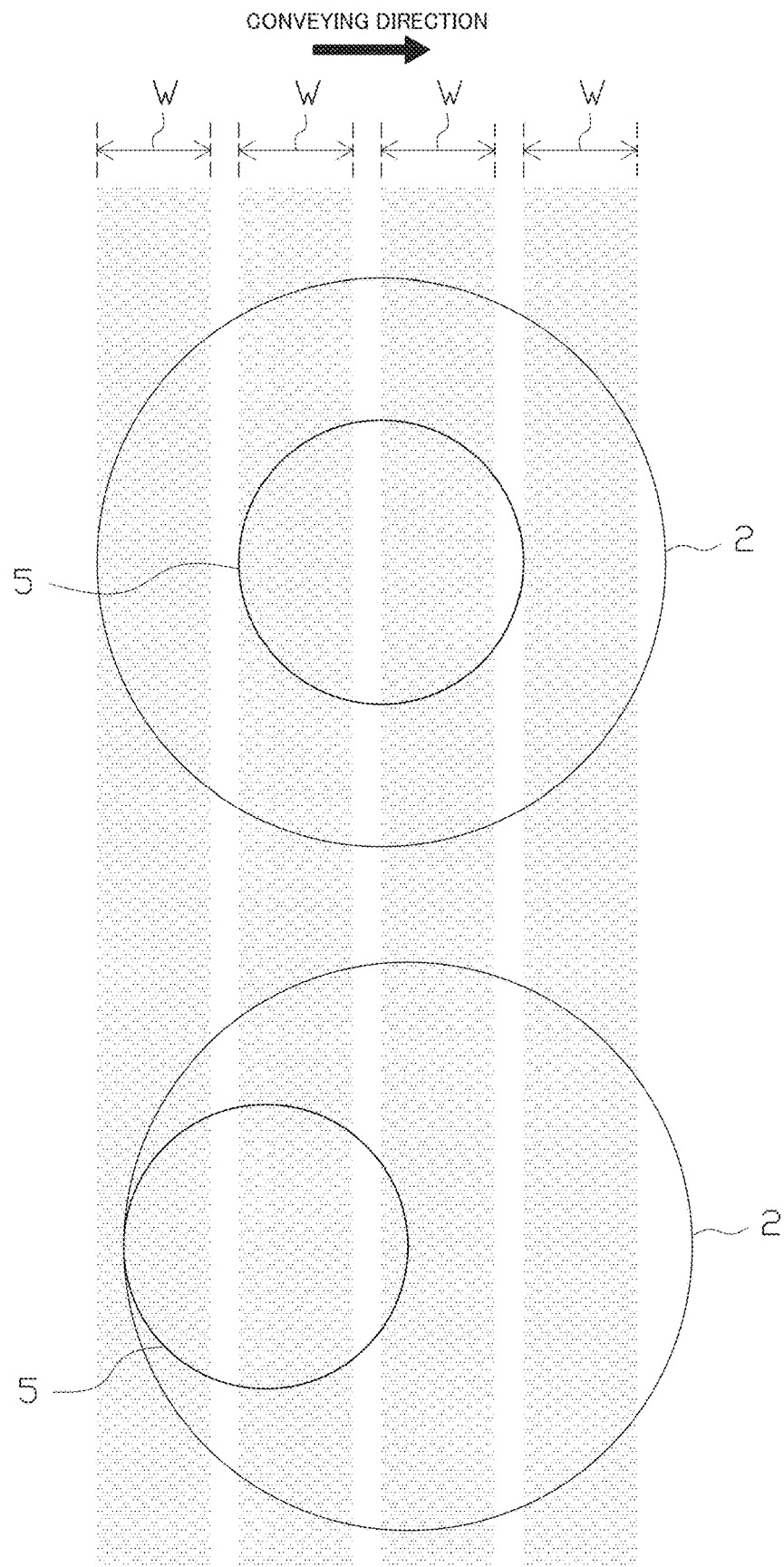
Figure 10:
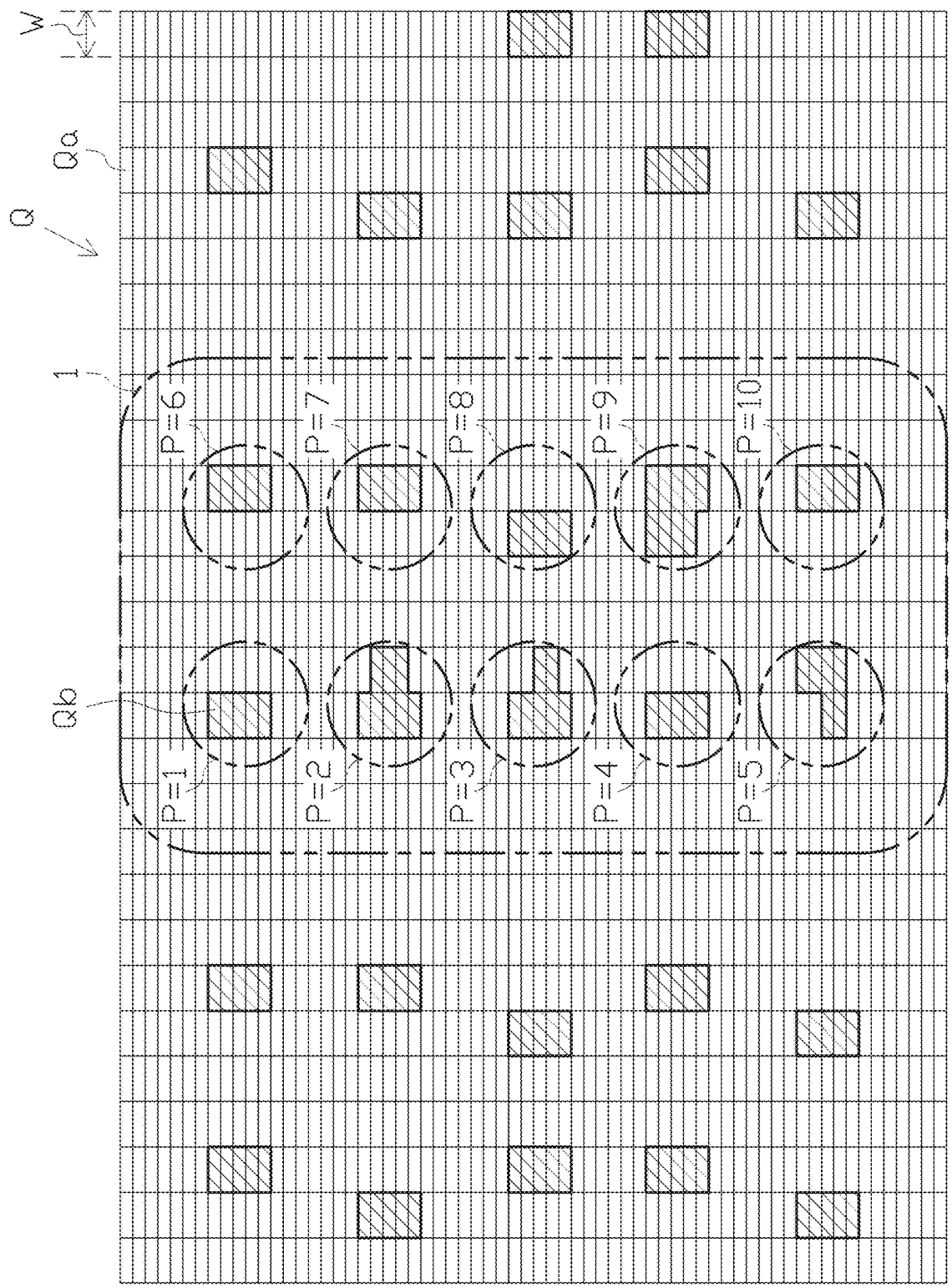
FIG. 10 is a diagram illustrating a spectral image.

As shown in FIG. 9, every time a predetermined amount of the container film 3 (tablet 5) is conveyed, the conveying direction imaging range W is relatively moved intermittently and the measurement routine described above is performed repeatedly. This causes spectral data corresponding to the respective conveying direction imaging ranges W to be successively stored in time series into the image data storage device 74 along with position information in the film conveying direction (Y direction) and in the film width direction (X direction). This series of operations generate a two-dimensional spectral image Q having spectral data with regard to each pixel (as shown in FIG. 10).

The following describes the spectral image Q according to one or more embodiments. As shown in FIG. 10, the spectral image Q is image data including a plurality of pixels Qa arrayed in a two-dimensional arrangement. The respective pixels Qa include spectral data (data indicating spectral intensities (luminance values) in a predetermined number n (for example, n=100 bands) of wavelength bands).

When obtaining the spectral image Q in a predetermined inspection range (as shown by a two-dot chain line portion in FIG. 10) corresponding to one PTP sheet 1 as an object to be inspected, the control processing device 54 performs an inspection routine.

Figure 11:
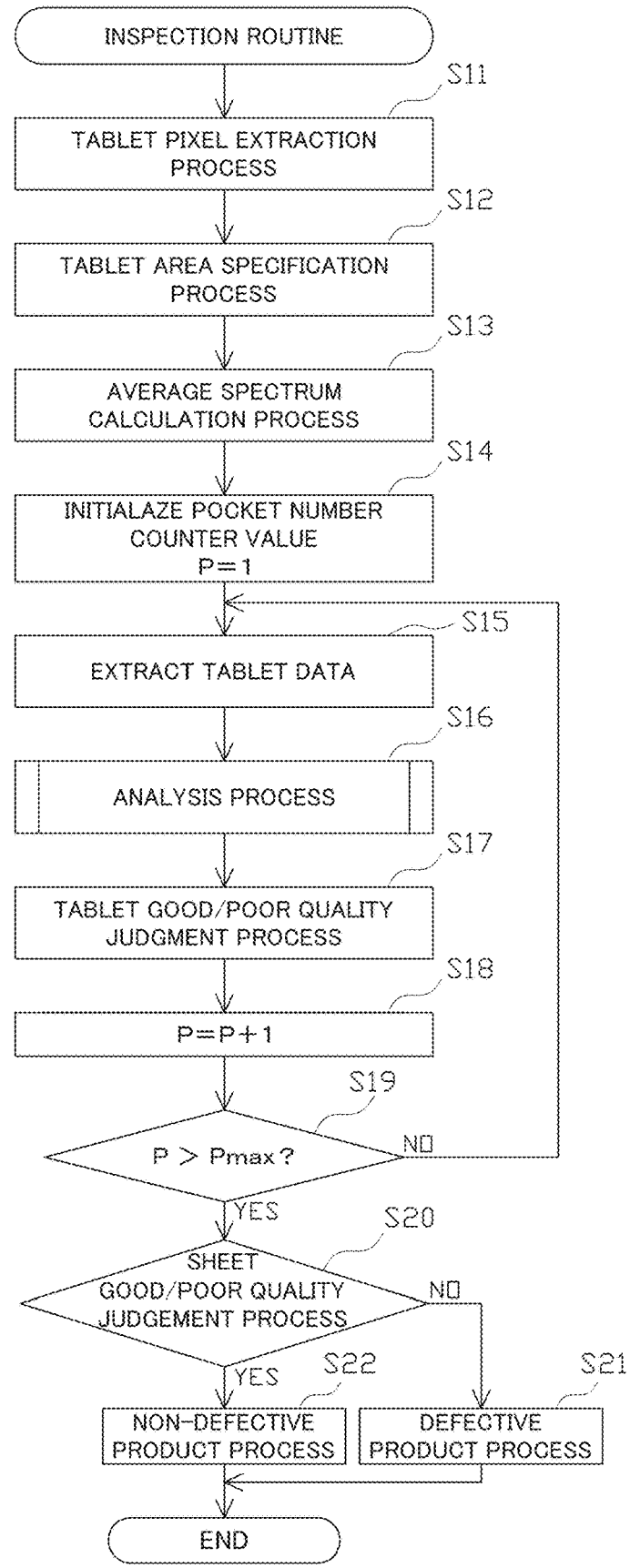
FIG. 11 is a flowchart showing an inspection routine.

The following describes the inspection routine with reference to the flowchart of FIG. 11. This routine is performed repeatedly every time the spectral image Q in the inspection range described above is obtained.

The control processing device 54 first performs a tablet pixel extraction process at step S11. In this process, the control processing device 54 extracts pixels Qb corresponding to the tablet 5 as an object to be analyzed (hereinafter referred to as "tablet pixels" Qb), among the respective pixels Qa of the spectral image Q.

According to one or more embodiments, for example, the control processing device 54 determines whether the spectral intensities (luminance values) at a predetermined wavelength in the spectral data of the respective pixels Qa are equal to or greater than a predetermined reference value and processes the spectral image Q by a binarization process. The control processing device 54 then extracts the tablet pixels Qb, based on the obtained binarized image data (as shown in FIG. 10 and FIG. 12).

Figure 12:
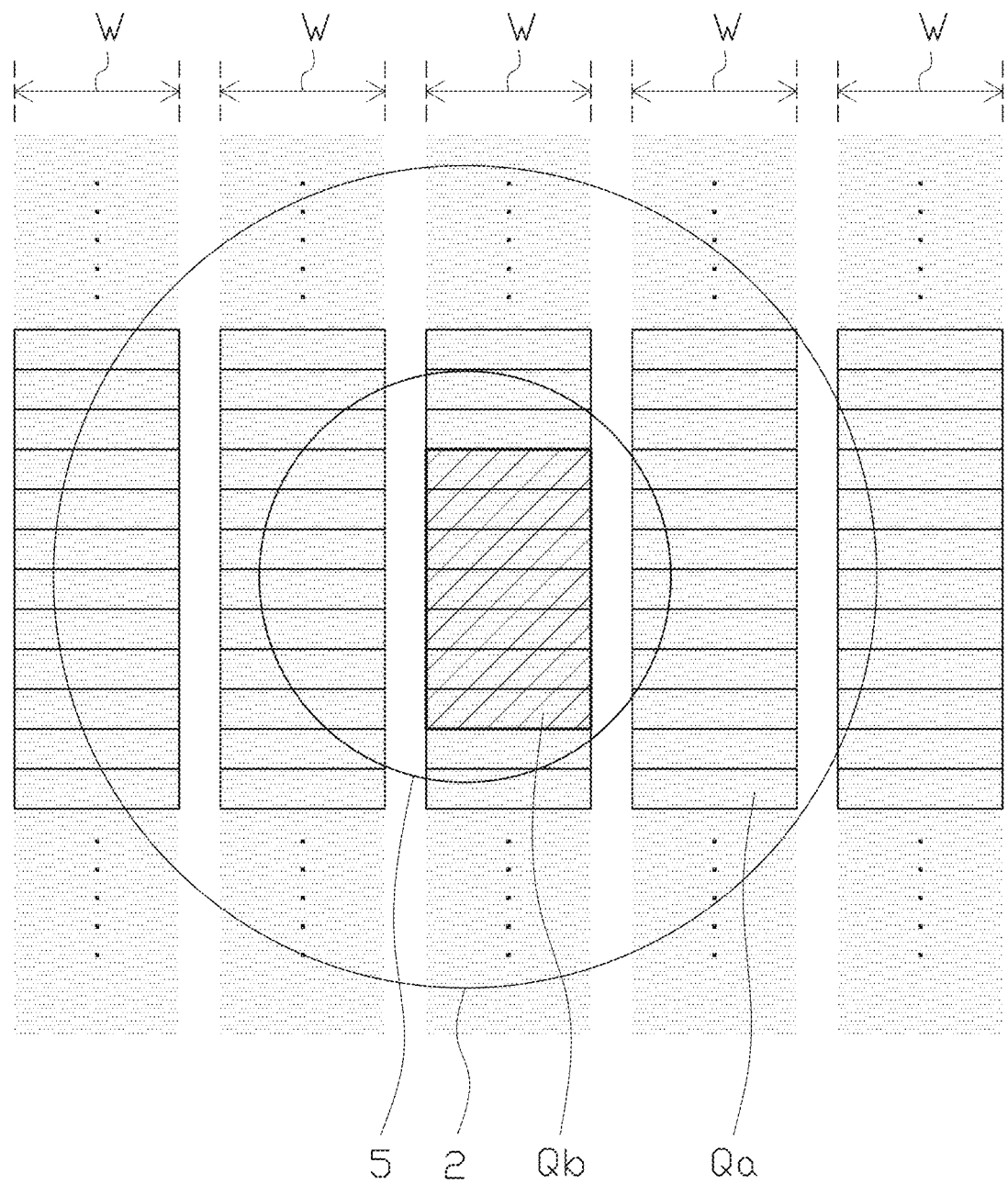
FIG. 12 is a diagram illustrating a relationship between the conveying direction imaging range and the spectral image.

According to one or more embodiments, as shown in FIG. 12, pixels Qa including data of imaging only the range of the tablet 5 without being affected by background are extracted as tablet pixels Qb. FIG. 12 is a diagram illustrating a relationship between the conveying direction imaging range W and the spectral image Q. Pixels extracted as the tablet pixels Qb are given as hatched areas in FIGS. 10 and 12.

The extraction procedure of the tablet pixels Qb is, however, not limited to this method, but another method may be employed. For example, another employable method may calculate an integrated value of spectral data (spectral intensities in the respective wavelength bands) with regard to each of the pixels Qa and determine whether the calculated integrated value is equal to or greater than a predetermined reference value, so as to extract the tablet pixels Qb.

The control processing device 54 subsequently performs a tablet area specification process at step S12. In this process, the control processing device 54 specifies areas of the ten tablets 5 placed in the respective pocket portions 2 in the inspection range.

According to one or more embodiments, for example, the control processing device 54 performs a labeling process with regard to the tablet pixels Qb obtained at step S11 described above and regards all adjacent tablet pixels Qb as linkage components of the tablet pixels Qb belonging to one identical tablet 5.

This process specifies one range of linkage components as a tablet area with regard to one tablet 5 placed in a predetermined pocket portion 2 (as shown in FIG. 10 and FIG. 12). In FIG. 10 and FIG. 12, linkage components (tablet area) of a plurality of tablet pixels Qb belonging to each tablet 5 are encircled by a thick frame.

The area specification procedure of the tablet 5 is, however, not limited to this method, but another method may be employed. For example, another employable method may determine pixels included in a predetermined range about a specific pixel at center, as pixels belonging to one identical tablet 5 with the specific pixel.

The control processing device 54 subsequently performs an average spectrum calculation process at step S13. In this process, with regard to each of the tablet areas of the respective tablets 5 specified at step S12 described above, the control processing device 54 calculates average spectral data of the tablet 5 by using spectral data of a plurality of tablet pixels Qb included in the tablet area.

According to one or more embodiments, the control processing device 54 averages all spectral data of a plurality of tablet pixels Qb belonging to the tablet area of one tablet 5 and calculates the averaged spectral data as average spectral data with regard to the tablet 5. This configuration is, however, not essential. A modification may be configured to extract part of a plurality of tablet pixels Qb belonging to the tablet area of one tablet 5 and calculate average spectral data with regard to the tablet 5 by using spectral data of the extracted tablet pixels Qb.

After calculating the average spectral data (hereinafter referred to as "spectrum measurement data") with regard to the respective ten tablets 5 placed in the respective pocket portions 2 in the inspection range, the control processing device 54 collectively stores these spectrum measurement data as measurement data with regard to one inspection range into the calculation result storage device 75.

According to one or more embodiments, spectral intensities $V(i)$ in respective wavelength bands (band number $i=1$ to $n$) are stored as spectrum measurement data of one tablet 5.

The "band number i ($1 \leq i \leq n$: i is a natural number)" denotes a serial number assigned to each of a predetermined number n (for example, n=100 bands) of wavelength bands included in the spectrum measurement data.

At subsequent step S14, the control processing device 54 sets a counter value P of a pocket number counter provided in the calculation result storage device 75 to an initial value "1".

The "pocket number" denotes a serial number set corresponding to each of the ten pocket portions 2 included in one inspection range. The position of each pocket portion 2 is specified by the counter value P of the pocket number counter (hereinafter simply referred to as "pocket number counter value P") (as shown in FIG. 10).

In the illustrated example of FIG. 10, for example, an uppermost pocket portion 2 in a left column is set as the pocket portion 2 corresponding to a pocket number counter value [1]. A lowermost pocket portion 2 in a right column is set as the pocket portion 2 corresponding to a pocket number counter value [10].

The control processing device 54 subsequently performs a tablet data extraction process at step S15. In this process, the control processing device 54 extracts spectrum measurement data of a tablet 5 placed in a pocket portion 2 corresponding to a current pocket number counter value P (for example, P=1), from the measurement data with regard to one inspection range (spectrum measurement data of the ten tablets 5) obtained at step S13 described above.

Figure 13:
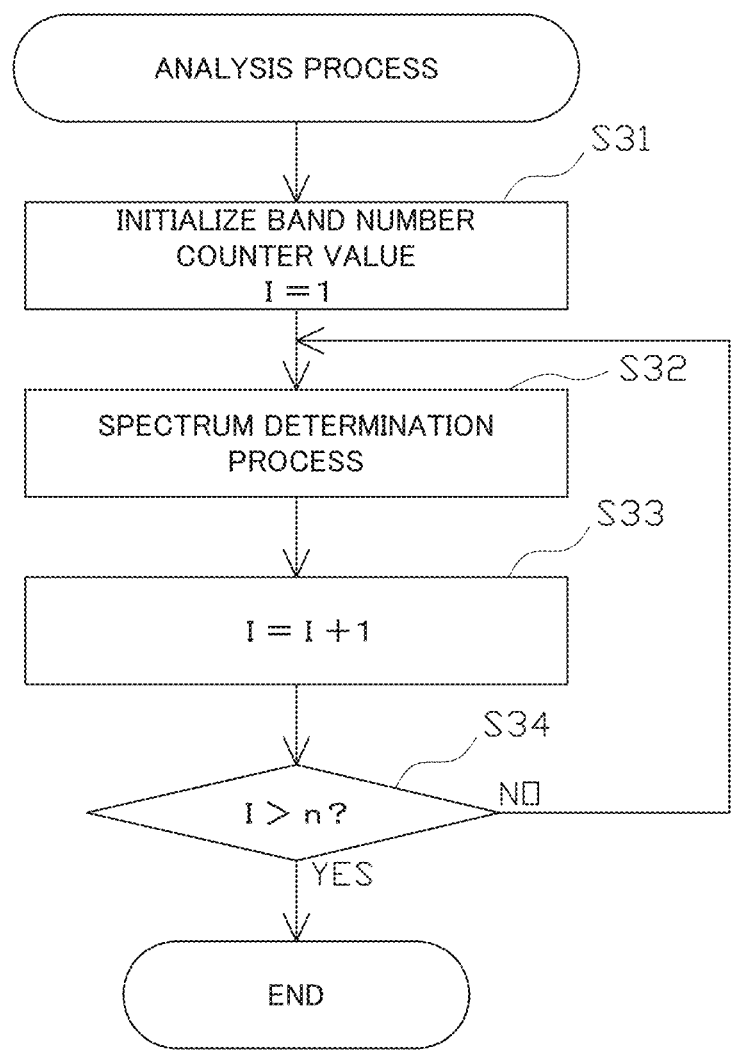
FIG. 13 is a flowchart showing an analysis process.

The control processing device 54 subsequently performs an analysis process of the spectrum measurement data of the tablet 5 extracted at step S15 (step S16). The flow of the analysis process is described in detail with reference to the flowchart of FIG. 13.

The control processing device 54 first sets a counter value I of a band number counter (hereinafter simply referred to as "band number counter value I") provided in the calculation result storage device 75 to an initial value "1" at step S31.

The "band number counter value I" is provided corresponding to the "band number i" described above and is used to specify a wavelength band as an object to be analyzed.

At subsequent step S32, the control processing device 54 performs a spectrum determination process. In this process, the control processing device 54 refers to a spectrum allowable range table provided in the set data storage device 76 and performs good/poor quality judgment with regard to a spectral intensity V(i) in a wavelength band of a band number i specified by a current band number counter value I, out of spectral intensities V(i) in n wavelength bands (band number i=1 to n) included in the spectrum measurement data of the tablet 5 extracted at step S15 described above.

The spectrum allowable range table is provided to determine an allowable range D(i) of the spectral intensity V(i) with regard to each of the n wavelength bands (band number i=1 to n). One spectrum allowable range table is set corresponding to each of the positions of the ten pocket portions 2 (the pocket number counter value P) included in one inspection range. In other words, ten spectrum allowable range tables are set for one inspection range according to one or more embodiments.

Accordingly, in this process, the control processing device 54 refers to the spectrum allowable range table corresponding to the current pocket number counter value P and determines whether the spectral intensity V(i) in the wavelength band of the band number i specified by the current band number counter value I is within the allowable range D(i) corresponding to the wavelength band of the band number i.

The control processing device 54 then stores the result of determination ("good" or "poor") into the calculation result storage device 75.

The allowable range D(i) with regard to each of the wavelength bands calculated on the basis of spectrum measurement data with respect to a predetermined number (for example, 200) of tablets 5 included in non-defective PTP sheets 1 obtained in advance prior to a start of inspection is set in the spectrum allowable range table at the start of inspection.

The control processing device 54 subsequently adds "1" to the current band number counter value I at step S33 and then proceeds to step S34 to determine whether the newly set band number counter value I exceeds a maximum value n (the number n of wavelength bands included in the spectrum measurement data).

In the case of negative determination, the control processing device 54 goes back to step S32 to perform the series of processing described above again. In the case of affirmative determination, on the other hand, the control processing device 54 determines that the good/poor quality judgment has been completed with regard to the spectral intensities V(i) in all the wavelength bands and then terminates this process.

Referring back to the inspection routine shown in the flowchart of FIG. 11, the control processing device 54 performs a tablet good/poor quality judgment process at step S17.

In this process, the control processing device 54 determines whether the tablet 5 placed in the pocket portion 2 corresponding to the current pocket number counter value P (for example, P=1) is a non-defective product (identical type) or a defective product (different type), based on the result of analysis obtained by the analysis process at step S16 described above.

More specifically, when there is no spectral intensity V(i) determined as "defective" out of the spectral intensities V(i) in the n wavelength bands (band number i=1 to n) included in the spectrum measurement data of the tablet 5, the tablet 5 is determined as "non-defective". When there is any spectral intensity V(i) determined as "defective", on the other hand, the tablet 5 is determined as "defective".

The control processing device 54 stores the result of determination with regard to the tablet 5 ("non-defective" or "defective") into the calculation result storage device 75. Accordingly, the analysis process of step S16 described above and the tablet good/poor quality judgment process of step S17 described above are configured as the determination process according to one or more embodiments. The processing function of the control processing device 54 that performs these processes configures the determination module according to one or more embodiments.

The control processing device 54 subsequently adds "1" to the current pocket number counter value P at step S18 and proceeds to step S19 to determine whether the newly set pocket number counter value P exceeds a maximum value Pmax. The maximum value Pmax denotes a maximum value of the number of pocket portions 2 included in one inspection range ("10" according to one or more embodiments).

In the case of negative determination, the control processing device 54 goes back to step S15 to perform the series of processing described above again. In the case of affirmative determination, on the other hand, the control processing device 54 determines that the good/poor quality judgment of the tablets 5 with respect to all the pocket portions 2 has been completed and proceeds to step S20.

At subsequent step S20, the control processing device 54 performs a sheet good/poor quality judgment process. In this process, the control processing device 54 determines whether the PTP sheet 1 corresponding to the inspection range is a non-defective product or a defective product, based on the result of determination in the tablet good/poor quality judgment process at step S17 described above.

More specifically, when there is no tablet 5 determined as "defective" in the inspection range, the control processing device 54 determines the PTP sheet 1 corresponding to the inspection range as a "non-defective product" and proceeds to step S21.

When there is any tablet 5 determined as "defective" in the inspection range, on the other hand, the control processing device 54 determines the PTP sheet 1 corresponding to the inspection range as a "defective product" and proceeds to step S22.

The control processing device 54 performs a defective product process at step S21 to store the result of determination as the "defective product" with regard to the PTP sheet 1 in the calculation result storage device 75, outputs this determination result to the defective sheet discharge mechanism or the like of the PTP packaging machine 10, and then terminates the inspection routine.

The control processing device 54 performs a non-defective product process at step S22 to store the result of determination as the "non-defective product" with regard to the PTP sheet 1 (inspection range) in the calculation result storage device 75. At the same time, the control processing device 54 stores the measurement data with regard to the PTP sheet 1 (spectrum measurement data of the ten tablets 5) into a non-defective product data storage module provided in the calculation result storage device 75.

The "non-defective product data storage module" is a storage module configured to successively store the measurement data with regard to the PTP sheet 1 determined as the "non-defective product" in time series every time the inspection is performed, and corresponds to the "spectral data storage module" according to one or more embodiments. Accordingly, the process of storing the measurement data with regard to the PTP sheet 1 into the non-defective product data storage module configures the spectral data storage process according to one or more embodiments.

Figure 14:
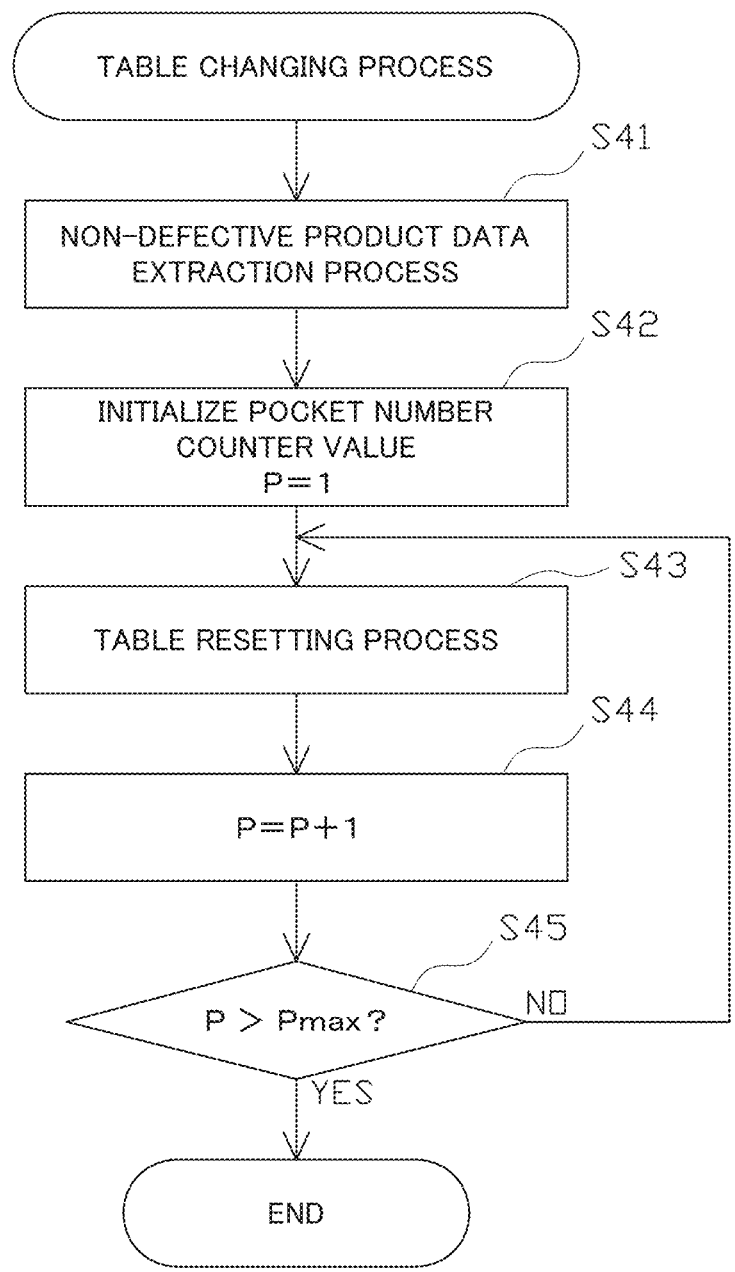
FIG. 14 is a flowchart showing a table changing process.

The control processing device 54 subsequently performs a table changing process. This table changing process is a process of changing the contents of the spectrum allowable range table set in the set data storage device 76 described above. A flow of the table changing process is described in detail with reference to the flowchart of FIG. 14.

The control processing device 54 first performs a non-defective product data extraction process at step S41. In this process, the control processing device 54 extracts measurement data with regard to a last predetermined number m (for example, m=200) of non-defective PTP sheets 1 (hereinafter referred to as "non-defective product data") stored in time series in the non-defective product data storage module of the calculation result storage device 75.

More specifically, the contents at m address positions where the last m non-defective product data are stored are read out, on the basis of a predetermined address position in the non-defective product data storage module where latest non-defective product data is stored in the current cycle of the non-defective product process (at step S22).

At subsequent step S42, the control processing device 54 sets the pocket number counter value P to the initial value of "1".

The control processing device 54 subsequently performs a table resetting process at step S43. In this process, the control processing device 54 first extracts spectrum measurement data of the tablet 5 placed in the pocket portion 2 corresponding to the current pocket number counter value P (for example, P=1) from each of the m non-defective product data extracted at step S41 described above.

The control processing device 54 subsequently calculates an average spectral intensity $\mu(i)$ that is an average value of the spectral intensities $V(i,j)$ in each of the wavelength bands (band number i=1 to n), based on the extracted spectrum measurement data of the m tablets 5 (non-defective product number j=1 to m), and calculates a standard deviation $\sigma(i)$ of the spectral intensity $V(i,j)$ in each of the wavelength bands (as shown in FIG. 15).

The non-defective product number j ($1 \leq j \leq m$, j is a natural number) denotes a serial number assigned to each of the m non-defective product data extracted at step S41 described above.

FIG. 15 illustrates extract of spectral intensities $V(i,j)$ in wavelength bands of band numbers [1] to [3] with regard to non-defective product data of non-defective product numbers [1] to [5], as well as average spectral intensities $\mu(i)$ and standard deviations $\sigma(i)$ calculated by using the extracted spectral intensities $V(i,j)$.

The process of calculating the average spectral intensity $\mu(i)$ corresponds to the average value calculation process according to one or more embodiments. The processing function of the control processing device 54 that performs this process configures the average value calculation module according to one or more embodiments.

The process of calculating the standard deviation $\sigma(i)$ corresponds to the standard deviation calculation process according to one or more embodiments. The processing function of the control processing device 54 that performs this process configures the standard deviation calculation module according to one or more embodiments.

The control processing device 54 subsequently calculates reference values L(i) [an upper limit reference value La(i) and a lower limit reference value Lb(i)] with regard to each of the wavelength bands (band number i=1 to n), which is used for determination of the spectral intensity V(i) in each of the wavelength bands, based on the average spectral intensity $\mu(i)$ and the standard deviation $\sigma(i)$ in each of the wavelength bands calculated as described above. According to one or more embodiments, the reference value L(i) is calculated by Expression (1) given below:

$$L(i)=\mu(i)\pm K\times\sigma(i) \quad (1)$$

where L(i) denotes a reference value in a wavelength band of a band number i; K denotes a coefficient; $\mu(i)$ denotes an average spectral intensity in the wavelength band of the band number i; and $\sigma(i)$ denotes a standard deviation in the wavelength band of the band number i.

More specifically, the upper limit reference value La(i) and the lower limit reference value Lb(i) are respectively expressed by Expressions (2) and (3) given below:

$$La(i)=\mu(i)+K\times\sigma(i) \quad (2)$$

$$La(i)=\mu(i)-K\times\sigma(i) \quad (3)$$

Accordingly, the process of calculating the reference value L(i) described above corresponds to the reference value calculation process according to one or more embodiments. The processing function of the control processing device 54 that performs this process configures the reference value calculation module according to one or more embodiments.

The control processing device 54 subsequently determines whether the upper limit reference value La(i) calculated as described above with regard to each of the wavelength bands (band number i=1 to n) is smaller than a maximum allowable value Dmax. The maximum allowable value Dmax denotes a threshold value allowable as a manufactured product, i.e., a maximum value settable as the allowable range D(i) described above, and is set in advance in the set data storage device 76.

When the upper limit reference value La(i) is smaller than the maximum allowable value Dmax, the control processing device 54 sets the upper limit reference value La(i) as an upper limit value of the allowable range D(i) with regard to the wavelength band of the band number i in the spectrum allowable range table corresponding to the current pocket number counter value P currently set in the set data storage device 76.

When the upper limit reference value La(i) is equal to or larger than the maximum allowable value Dmax, on the other hand, the control processing device 54 sets the maximum allowable value Dmax as the upper limit value of the allowable range D(i) described above.

Similarly, the control processing device 54 determines whether the lower limit reference value Lb(i) calculated as described above with regard to each of the wavelength bands (band number i=1 to n) is larger than a minimum allowable value Dmin. The minimum allowable value Dmin denotes a threshold value allowable as a manufactured product, i.e., a minimum value settable as the allowable range D(i) described above, and is set in advance in the set data storage device 76.

When the lower limit reference value Lb(i) is larger than the minimum allowable value Dmin, the control processing device 54 sets the lower limit reference value Lb(i) as a lower limit value of the allowable range D(i) with regard to the wavelength band of the band number i in the spectrum allowable range table corresponding to the current pocket number counter value P currently set in the set data storage device 76.

When the lower limit reference value Lb(i) is equal to or smaller than the minimum allowable value Dmin, on the other hand, the control processing device 54 sets the minimum allowable value Dmin as the lower limit value of the allowable range D(i) described above.

After resetting the upper limit value and the lower limit value of the allowable range D(i) in each of the wavelength bands in the spectrum allowable range table corresponding to the current pocket number counter value P as described above, the control processing device 54 proceeds to step S44.

The series of processes to reset the upper limit value and the lower limit value of the allowable range D(i) in each of the wavelength bands corresponds to the changing process according to one or more embodiments. The processing function of the control processing device 54 that performs this process configures the changing module according to one or more embodiments.

The control processing device 54 subsequently increments the current pocket number counter value P by "one (1)" at step S44 and proceeds to step S45 to determine whether the newly set pocket number counter value P exceeds a maximum value Pmax.

In the case of negative determination, the control processing device 54 goes back to step S43 to perform the series of processing described above again. In the case of affirmative determination, on the other hand, the control processing device 54 considers that the spectrum allowable range tables have been reset with regard to all the pocket portions 2 of the pocket numbers [1] to [10], and terminates the table changing process.

After termination of the table changing process, the control processing device 54 terminates the non-defective product process at step S22 and then terminates the inspection routine.

As described above in detail, the configuration of one or more embodiments feeds back the result of spectral analysis with regard to the last predetermined number m of non-defective PTP sheets 1, while continuously performing the different type inclusion inspection that takes advantage of spectral analysis or the like. The configuration of one or more embodiments thus enables the spectrum allowable range table (the allowable range D(i) of the spectral intensity V(i) in each of the wavelength bands) that is used for the good/poor quality judgment of the spectrum measurement data of the tablet 5 to be changed occasionally.

This configuration enables the good/poor quality judgment of the spectrum measurement data of the tablet 5 as the inspection object to be performed in the inspection process by using the more suitable spectrum allowable range table, in response to a change of the inspection device 22 with time, a change of the tablets 5 with time or the like.

As a result, this configuration suppresses an increase in non-defective error ratio with regard to the tablet 5 and also an increase in defective error ratio and thereby enhances the inspection accuracy, without requiring to set in advance a relatively large width of the allowable range D(i).

Furthermore, one or more embodiments are configured to set the allowable range D(i) of the spectral intensity V(i) with regard to each of the wavelength bands and to change the allowable range D(i) with regard to each of the wavelength bands. This configuration allows for the more detailed response to a change of the inspection device 22 with time, a change of the tablets 5 with time or the like, with regard to each of the wavelength bands, thus further enhancing the inspection accuracy.

Moreover, one or more embodiments are configured to set one spectrum allowable range table corresponding to each of the positions of the ten pocket portions 2 in one PTP sheet 1 (inspection range) and to perform the good/poor quality judgment of the tablet 5 that is placed in each of the pockets 2, based on the spectrum allowable range table.

Additionally, the non-defective product storage module is configured to individually store the spectrum measurement data of the tablets 5 placed in the respective pocket portions 2. The table changing process described above is configured to perform the process of calculating the average spectral intensity μ(i), the process of calculating the standard deviation σ(i), the process of calculating the reference value L(i), the process of resetting the allowable range D(i) and the like, individually with regard to each of the pocket portions 2.

As a result, this configuration reduces an influence of an unevenness in luminance of the near-infrared light emitted from the illumination device 52, an influence of a variation in sensitivity based on the characteristics of the plurality of light-receiving elements 64 constituting the imaging element 65, and the like. This configuration also allows for the more detailed response to a change of the inspection device 22 with time, a change of the tablets 5 with time or the like with regard to each of the pocket portions 2, thus further enhancing the inspection accuracy.

The present invention is not limited to the description of the above embodiments but may be implemented, for example, by configurations described below. The present invention may also be naturally implemented by applications and modifications other than those illustrated below.

(a) The embodiments described above illustrates the case where the content is the tablet 5. The type, the shape and the like of the content are, however, not specifically limited. The content may be, for example, a capsule, a supplement, or a food item. The tablet includes a solid preparation such as an uncoated tablet and a sugar-coated tablet.

(b) The materials of the container film 3 and the cover film 4 are not limited to those of the embodiments described above, but other materials may be employed. For example, the container film 3 may be made from a metal material that contains aluminum as a main material, for example, aluminum laminated film.

(c) The arrangement and the number of the pocket portions 2 in the PTP sheet 1 are not limited at all to those described in the above embodiments. A PTP sheet may be configured to have any of various other arrangements of and any number of pocket portions, for example, a total of twelve pocket portions arrayed in three lines.

(d) The above embodiments are configured to perform the different type inclusion inspection by the inspection device 22 in a post process after the pocket portions 2 are filled with the tablets 5 and a previous process before the cover film 4 is mounted to the container film 3.

This configuration is, however, not restrictive. For example, a modification may be configured to perform the different type inclusion inspection by the inspection device 22 across the pocket portions 2 from the container film 3—side of the PTP film 6 in a post process after the cover film 4 is mounted to the container film 3 and a previous process before the PTP sheet 1 is punched out from the PTP film 6.

Another modification may be configured to perform the different type inclusion inspection by the inspection device 22 across the pocket portions 2 from the container film 3—side of the PTP sheet 1 conveyed by the conveyor 39 in a post process after the PTP sheet 1 is punched out from the PTP film 6.

In this case, in place of the configuration that the inspection device 22 is provided inside of the PTP packaging machine 10 (inline configuration), the inspection device 22 may be provided as a device separate from the PTP packaging machine 10 to perform offline inspection of the PTP sheet 1. In this modification, the inspection device 22 may be provided with a conveyance unit configured to convey the PTP sheet 1.

Another modification may be configured to perform the different type inclusion inspection by the inspection device 22 in a previous process before the pocket portions 2 are filled with the tablets 5. For example, the inspection may be performed in a pre-stage before the tablets 5 are supplied to the tablet filling device 21. Accordingly, the inspection device 22 may be provided as a device separate from the PTP packaging machine 10 to perform offline inspection of the tablets 5.

The offline inspection may be performed in the state that the PTP sheet 1 or the tablets 5 are not continuously conveyed but are at stop. From the viewpoint of enhancing the productivity, however, the inline inspection may be performed, while the PTP sheet 1, the PTP film 6 or the container film 3 is conveyed continuously.

In the manufacturing field of the PTP sheet 1 or the like, there is a recent demand for increasing the speed of various inspections such as different type inclusion inspection, accompanied with an increase in the production rate. For example, an inspection performed on the PTP packaging machine 10 may be required to inspect 100 or more tablets 5 per second.

(e) The configurations of the illumination device 52 and the imaging device 53 are not limited to those described in the above embodiments. For example, a reflection type diffraction grating, a prism or the like may be employed as the spectral unit, in place of the two-dimensional spectroscope 62.

(f) According to the embodiments described above, the spectrum determination process at step S32 is configured to determine each of the spectral intensities V(i) in all the n wavelength bands (for example, n=100 bands) included in the spectrum measurement data of the tablet 5 is within the allowable range D(i) and thereby perform the good/poor quality judgment of the tablet 5.

This configuration is, however, not restrictive. For example, a modification may be configured to determine whether each of the spectral intensities in N specific wavelength bands (N is a natural number of not less than 1, for example, N=30 bands) out of the n wavelength bands (for example, n=100 bands) included in the spectrum measurement data of the tablet 5 is within the allowable range and thereby perform the good/poor quality judgment of the tablet 5.

(g) According to the embodiments described above, the table resetting process at step S43 is configured to calculate the average spectral intensity $\mu(i)$ that is the average value of the spectral intensities V(i,j) in each of the wavelength bands (band number i=1 to n), based on the spectrum measurement data of the m non-defective tablets 5 (non-defective product number j=1 to m), to calculate the standard deviation $\sigma(i)$ of the spectral intensity V(i,j) in each of the wavelength bands, and to calculate the reference values L(i) [the upper limit reference value La(i) and the lower limit reference value Lb(i)] with regard to each of the wavelength bands, which is used for determination of the spectral intensity V(i) in each of the wavelength bands, based on the average spectral intensity $\mu(i)$ and the standard deviation $\sigma(i)$ in each of the wavelength bands.

The method of calculating the reference value L(i) is, however, not limited to the above embodiments. The configuration is required to calculate the reference value L(i), based on at least the average spectral intensity $\mu(i)$ with regard to each of the wavelength bands.

For example, a modification may be configured to calculate a value that is larger than the average spectral intensity $\mu(i)$ by a predetermined value as the upper limit reference value La(i) and to calculate a value that is smaller than the average spectral intensity $\mu(i)$ by a predetermined value as the lower limit reference value Lb(i).

(h) According to the embodiments described above, the table resetting process at step S43 is configured to calculate the upper limit reference value La(i) and the lower limit reference value Lb(i) as the reference values L(i) and to reset the upper limit value and the lower limit value of the allowable range D(i) in each of the wavelength bands.

This configuration is, however, not restrictive. A modification may be configured to calculate one of the upper limit reference value La(i) and the lower limit reference value Lb(i) and to reset only the upper limit value or the lower limit value of the allowable range D(i) in each of the wavelength bands. Another modification may be configured to determine the allowable range D(i) by only one reference value.

(i) The embodiments described above are configured to set the maximum allowable value Dmax as the threshold value which the upper limit value of the allowable range D(i) is allowed to take and to set the minimum allowable value Dmin as the threshold value which the lower limit value of the allowable range D(i) is allowed to take. The table resetting process at step S43 is configured not to set any upper limit value that is larger than the maximum allowable value Dmax or not to set any lower limit value that is smaller than the minimum allowable value Dmin.

This configuration is, however, not restrictive. A modification may be configured not to provide any threshold values but to set the reference values L(i) [the upper limit reference value La(i) and the lower limit reference value Lb(i)] calculated based on the average spectral intensity $\mu(i)$ and the standard deviation σ(i), as the upper limit value and the lower limit value of the allowable range D(i).

(j) In the table resetting process at step S43, a modification may be configured to perform a predetermined weighting process, such that a reflection ratio of later spectrum measurement data in time series or a group of spectrum measurement data that are continuous in time series and that are later in time series is higher than a reflection ratio of predetermined spectrum measurement data or a group of predetermined spectrum measurement data that are continuous in time series, among the spectrum measurement data of the last m non-defective tablets 5 stored in time series in the non-defective product data storage module of the calculation result storage device 75. The function that performs this process configures the weighting module according to one or more embodiments.

(k) The embodiments described above are configured to set one spectrum allowable range table corresponding to the position of each of the ten pocket portions 2 in one PTP sheet 1 (inspection range) and to individually perform the good/poor quality judgment of the tablets 5 placed in the respective pocket portions 2 based on these spectrum allowable range tables.

This configuration is, however, not restrictive. A modification may be configured to set only one spectrum allowable range table common to the positions of all the ten pocket portions 2 in one PTP sheet 1 (inspection range) and to perform the good/poor quality judgment of the tablets 5 placed in the respective pocket portions 2 based on this common spectrum allowable range table.

In the table changing process described above, a modification may be configured to calculate the average spectral intensity μ(i), the standard deviation σ(i) and the reference values L(i) and to perform the resetting process of the allowable range D(i) by using the spectrum measurement data of all the tablets 5 placed in the ten pocket portions 2.

(l) Although not being specifically referred to in the above embodiments, when the predetermined number m of non-defective product data has not yet been stored in the non-defective product data storage module of the calculation result storage device 75 at the start of an inspection, a modification may be configured to use non-defective product data obtained before the start of the inspection to compensate for the deficiency in the table changing process described above.

Another modification may be configured not to perform the table changing process described above until the predetermined number m of non-defective product data have been stored in the non-defective data storage module of the calculation result storage device 75 but to perform the good/poor quality judgment based on the spectrum allowable range table set before the start of the inspection.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 2 . . . pocket portion, 3 . . . container film, 4 . . . cover film, 5 . . . tablet, 10 . . . PTP packaging machine, 22 . . . inspection device, 52 . . . illumination device, 53 . . . imaging device, 54 . . . control processing device, 62 . . . two-dimensional spectroscope, 63 . . . camera, 64 . . . light-receiving element, 65 . . . imaging element, 74 . . . image data storage device, 76 . . . set data storage device, H . . . optical spectrum

What is claimed is:

1. An inspection device used in manufacture of a Press Through Package (PTP) sheet that comprises a container film including a pocket portion in which a content is placed and a cover film closing the pocket portion, the inspection device comprising:
   an illumination device that irradiates the content with near-infrared light;
   a spectroscope that disperses reflected light from the content irradiated with the near-infrared light;
   an imaging device that takes an image of an optical spectrum of the reflected light dispersed by the spectroscope and acquires spectroscopic image data; and
   a controller that:
      comprises a central processing unit (CPU),
      obtains spectral data of the content based on the spectroscopic image data, wherein the spectral data comprises spectral intensities,
      executes an inspection of the content based on the spectral data of the content,
      executes quality judgment of the content by determining whether each of the spectral intensities of the spectral data is within an allowable range of a corresponding spectral intensity in a corresponding wavelength band out of a plurality of wavelength bands included in the spectral data of the content,
      successively stores in time series spectral data of each of a plurality of contents previously inspected and determined as a non-defective product prior to storing the spectral data of the content,
      calculates an average value of the spectral intensities in the corresponding wavelength band based on the stored spectral data of the plurality of contents previously inspected and determined as non-defective products,
      calculates, based on the average value, a reference value used for determining whether each of the spectral intensities of the spectral data of the content is within the allowable range of the corresponding spectral intensity in the corresponding wavelength band, and
      changes, based on the reference value, the allowable range in each corresponding wavelength band.

2. The inspection device according to claim 1, wherein when executing a predetermined process using the stored spectral data, the controller executes a predetermined weighting process to make a first reflection ratio higher than a second reflection ratio, wherein the first reflection ratio is a reflection ratio of latest spectral data or of a group of spectral data that are latest and continuous in time series, and the second reflection ratio is a reflection ratio of predetermined spectral data or of a group of predetermined spectral data continuous in time series, among the stored spectral data.

3. The inspection device according to claim 1, wherein the imaging device simultaneously takes images of optical spectra of reflected lights from contents placed at a plurality of positions, and
the controller is disposed corresponding to each of the positions.

4. The inspection device according to claim 2, wherein the imaging device simultaneously takes images of optical spectra of reflected lights from contents placed at a plurality of positions, and the controller is disposed corresponding to each of the positions.

5. A Press Through Package (PTP) packaging machine that manufactures a PTP sheet, the PTP packaging machine comprising:
the inspection device according to claim 1;
a pocket portion former that forms a pocket portion in a belt-shaped container film;
a filler that fills a content into the pocket portion;
a mounter that mounts a cover film onto the container film to close the pocket portion; and
a separator that separates the PTP sheet from a belt-shaped body obtained by mounting the cover film to the container film.

6. A Press Through Package (PTP) packaging machine that manufactures a PTP sheet, the PTP packaging machine comprising:
the inspection device according to claim 2;
a pocket portion former that forms a pocket portion in a belt-shaped container film;
a filler that fills a content into the pocket portion;
a mounter that mounts a cover film onto the container film to close the pocket portion; and
a separator that separates the PTP sheet from a belt-shaped body obtained by mounting the cover film to the container film.

7. A Press Through Package (PTP) packaging machine that manufactures a PTP sheet, the PTP packaging machine comprising:
the inspection device according to claim 3;
a pocket portion former that forms a pocket portion in a belt-shaped container film;
a filler that fills a content into the pocket portion;
a mounter that mounts a cover film onto the container film to close the pocket portion; and
a separator that separates the PTP sheet from a belt-shaped body obtained by mounting the cover film to the container film.

8. A Press Through Package (PTP) packaging machine that manufactures a PTP sheet, the PTP packaging machine comprising:
the inspection device according to claim 4;
a pocket portion former that forms a pocket portion in a belt-shaped container film;
a filler that fills a content into the pocket portion;
a mounter that mounts a cover film onto the container film to close the pocket portion; and
a separator that separates the PTP sheet from a belt-shaped body obtained by mounting the cover film to the container film.

9. An inspection method of performing an inspection by spectral analysis in manufacture of a Press Through Package (PTP) sheet that comprises a container film including a pocket portion in which a content is placed and a cover film closing the pocket portion, the inspection method comprising:
irradiating the content with near-infrared light;
dispersing reflected light from the content irradiated with the near-infrared light;
taking an image of an optical spectrum of the reflected light dispersed in the dispersing, and acquiring spectroscopic image data;
obtaining spectral data of the content based on the spectroscopic image data, wherein the spectral data comprises spectral intensities;
executing quality judgment of the content by determining whether each of the spectral intensities of the spectral data is within an allowable range of a corresponding spectral intensity in a corresponding wavelength band out of a plurality of wavelength bands included in the spectral data of the content;
successively storing in time series spectral data of each of a plurality of contents previously inspected and determined as a non-defective product prior to storing the spectral data of the content;
calculating an average value of spectral intensities in the corresponding wavelength band based on the stored spectral data of the plurality of contents previously inspected and determined as non-defective products;
calculating, based on the average value, a reference value used for determining whether each of the spectral intensities of the spectral data of the content is within the allowable range of the corresponding spectral intensity in the corresponding wavelength band; and
changing, based on the reference value, the allowable range in each corresponding wavelength band.

* * * * *